US009165286B2

(12) United States Patent
Trier et al.

(10) Patent No.: US 9,165,286 B2
(45) Date of Patent: Oct. 20, 2015

(54) ELECTRONIC PROCESS-DRIVEN COLLABORATION SYSTEM

(75) Inventors: David E. Trier, Chicago, IL (US); Michael A. Holzman, Chicago, IL (US); Louis Charles Nebolsky, Northbrook, IL (US); Zsolt Benedek, Auburn, CA (US)

(73) Assignee: Accenture Global Services Limited, Dublin (IE)

( * ) Notice: Subject to any disclaimer, the term of this patent is extended or adjusted under 35 U.S.C. 154(b) by 215 days.

(21) Appl. No.: 13/039,289

(22) Filed: Mar. 2, 2011

(65) Prior Publication Data

US 2012/0084214 A1    Apr. 5, 2012

Related U.S. Application Data

(60) Provisional application No. 61/389,860, filed on Oct. 5, 2010.

(51) Int. Cl.
*G06F 3/048* (2013.01)
*G06Q 10/10* (2012.01)
*G06Q 10/06* (2012.01)

(52) U.S. Cl.
CPC ............... *G06Q 10/10* (2013.01); *G06Q 10/06* (2013.01); *G06Q 10/103* (2013.01)

(58) Field of Classification Search
CPC .................................. G06F 3/00; G06F 3/048
USPC ......................................................... 715/751
See application file for complete search history.

(56) References Cited

U.S. PATENT DOCUMENTS

| 2002/0157017 | A1 | 10/2002 | Mi et al. ..................... 713/200 |
| 2003/0061330 | A1 | 3/2003 | Frisco et al. ................. 709/223 |
| 2004/0102990 | A1* | 5/2004 | Jones ............................... 705/1 |
| 2004/0186762 | A1 | 9/2004 | Beaven et al. .................. 705/8 |
| 2005/0027585 | A1 | 2/2005 | Wodtke et al. .................. 705/9 |
| 2005/0095569 | A1 | 5/2005 | Franklin ....................... 434/350 |
| 2007/0276714 | A1* | 11/2007 | Beringer .......................... 705/7 |
| 2009/0119572 | A1* | 5/2009 | Koivunen ..................... 715/206 |
| 2009/0235182 | A1* | 9/2009 | Kagawa et al. .............. 715/753 |
| 2010/0138231 | A1* | 6/2010 | Linthicum et al. ............... 705/2 |
| 2010/0169233 | A1* | 7/2010 | Forbes et al. ................. 705/348 |

FOREIGN PATENT DOCUMENTS

| EP | 1 619 618 A1 | 1/2006 |
| EP | 1 699 009 A1 | 9/2006 |

OTHER PUBLICATIONS

H. Saggion et al. "Ontology-Based Information Extraction for Business Intelligence" (eBook: The Semantic Web, 6th International Semantic Web Conference, 2nd Asia Semantic Web Conference, Lecture Notes in Computer Science vol. 4825, Nov. 11-15, 2007, pp. 843-856).*

(Continued)

*Primary Examiner* — Jennifer To
*Assistant Examiner* — Xuyang Xia
(74) *Attorney, Agent, or Firm* — Brinks Gilson & Lione

(57) ABSTRACT

A business process-driven collaboration system embeds collaboration resources and tools directly into existing business processes and applications. The system provides a service layer connected to an existing business process management (BPM) service to embed collaboration resources into the process, and in particular, into the user interface of the existing business applications. The system provides an interface layer providing rapid enhancement of the existing business applications.

9 Claims, 20 Drawing Sheets

(56) References Cited

OTHER PUBLICATIONS

First Examiner's Report for Australian Application No. 2010206022 dated Mar. 30, 2011 (3p).

European Search Report for EP Application No. 11183845.4 dated Dec. 30, 2011 (7p).
Office Action for U.S. Appl. No. 12/537,830 dated Mar. 21, 2012 (15p).
Office Action for U.S. 12/537,830 dated Aug. 28, 2012 (16p).

* cited by examiner

ELECTRONIC PROCESS-DRIVEN COLLABORATION SYSTEM

1. PRIORITY CLAIM

This application claims priority to U.S. Provisional Patent Application No. 61/389,860, filed Oct. 5, 2010, which is incorporated herein by reference.

2. TECHNICAL FIELD

This application relates to electronic collaboration tools and applications. In particular, this application relates to integration of collaboration tools and applications into electronic business applications.

3. BACKGROUND

Business applications, such as those used to perform management consulting, banking, insurance etc. services, often use a complex set of resources and personnel to serve a client's needs. The resources and personnel needed to meet a client's needs may vary throughout a particular business process. With today's business and technology requirements, creating a cost-effective collaboration infrastructure that effectively identifies and leverages a business' best personnel and resources for a given task can be challenging.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

DETAILED DESCRIPTION

A Process-driven Collaboration (PDC) application embeds collaboration into business processes and applications to achieve top and bottom-line business results. The PDC application may be applied to many different industries—Banking, Insurance, Utilities, etc.—and provides a significant impact where, for example, the following circumstances may be present: Highly complex and/or exception driven processes; value is based on speed of turnaround; scarce resources are critical to success; and remote physical presence is required.

The PDC application is a vendor-agnostic, service-based solution that allows clients to quickly implement process-driven collaboration for a particular process/processes. This includes integrating into the client's enterprise systems—business process management (BPM), enterprise service bus (ESB), and the core business application (e.g., banking application).

Figure 1:
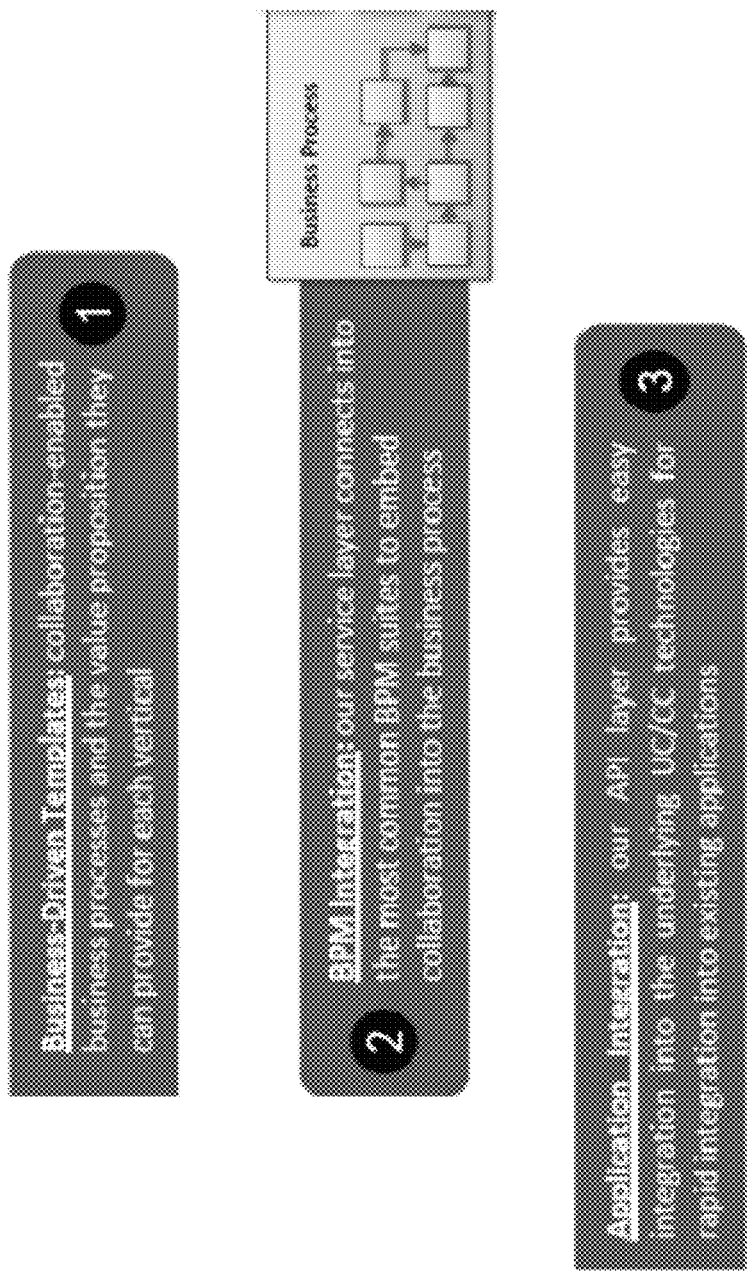
FIG. 1 shows an exemplary process-driven collaboration roadmap.

FIG. 1 shows an exemplary PDC roadmap 100. After identifying where and how collaboration can drive deep business results, such as increased cross-selling, the PDC application may be integrated with the corresponding business application. This includes (a) leveraging: the PDC BPM Integration services to embed the collaboration services in the business process by connecting into a BPM suite, such as into a Pega®, IBM®, Oracle® or other BPM system, and (b) leveraging the PDC UI components to embed the collaboration capabilities into an existing application.

Figure 2:
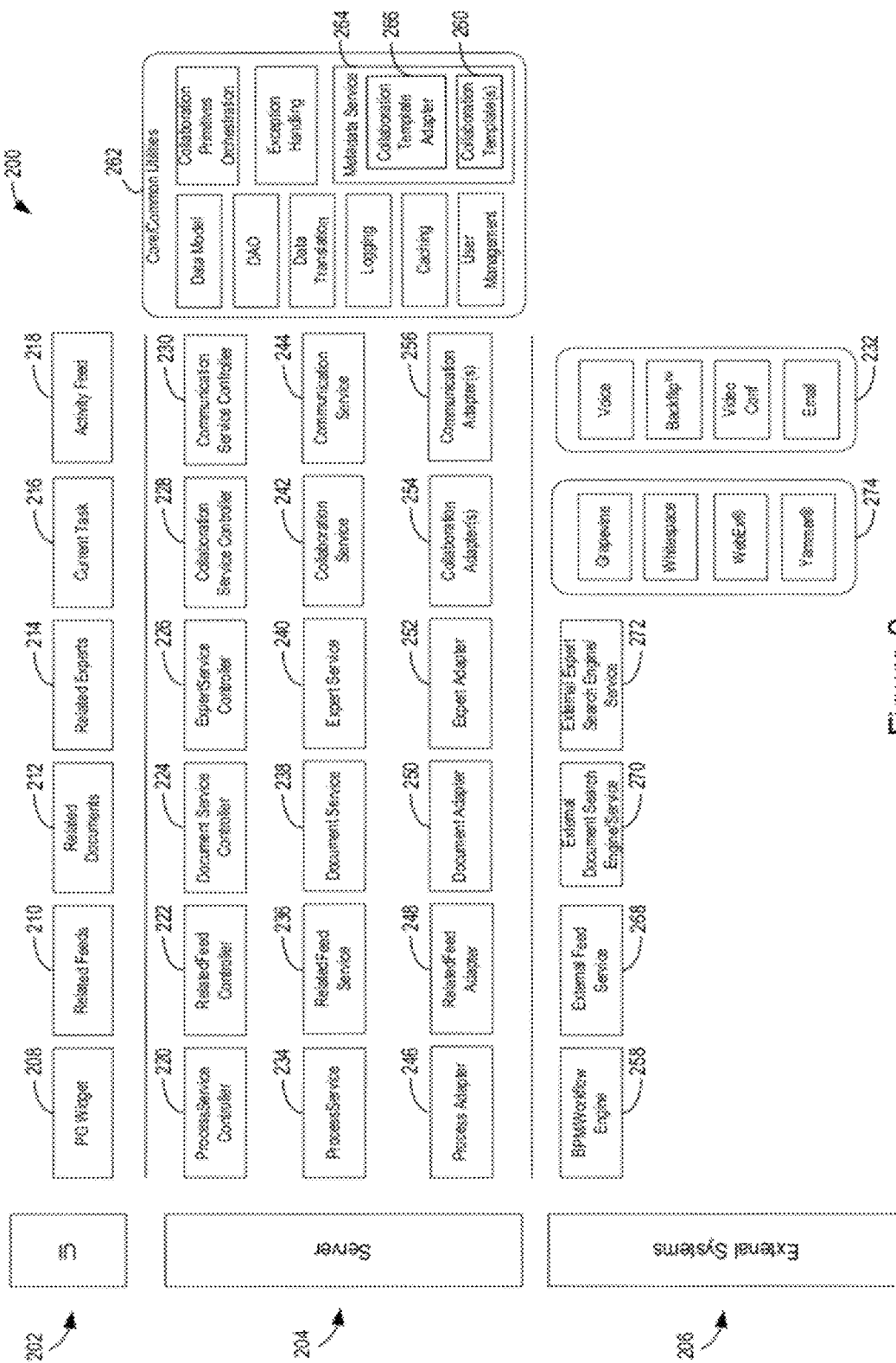
FIG. 2 shows a three-tier architecture utilized by a PDC application.

FIG. 2 shows a three-tier architecture 200 utilized by a PDC application. The architecture 200 includes a user interface (UI) components layer 202, a service layer 204, and an external services layer 206. The PDC application may be implemented on a PDC system that includes a computer processor and memory in communication with the processor.

The UI components layer 202 includes a light-weight set of Javascript widgets that can be embedded into existing applications. These widgets may include a process guidance (PG) widget 208, a relevant feeds widget 210, a related documents widget 212, a related experts widget 214, a current task widget 216 and an activity feed 218.

The service layer 204 includes controllers 220-230 for processing relevant data/information for the widgets of the UI components layer 202. For example, the service layer 204 includes a process service controller 220, related feed controller 222, document service controller 224, expert service controller 226 and collaboration service controller 228 corresponding to the PG widget 208, relevant feeds widget 210, related documents widget 212, related experts widget 214 and current task widget 216, respectively. The service layer 204 also includes a communication service controller 230 that processes relevant data/information for available external communication tools 232.

The service layer 204 includes services 234-244 corresponding to the controllers 220-230, respectively. The service layer 204 also includes adapters 246-256 that provide integration and communication with external systems and applications. The process adapter 246, for example, provides integration into businesses processes contained in a client's underlying Business Process Management (BPM) engine 258. The service layer 204 may include adapters for a variety of BPM suite vendors. The service layer 204 also includes one or more collaboration templates 260 that stores appropriate collaboration calls for the process service 246 and the static metadata for services 234-244, as well as core/common utilities 262 that support the overall functionality of the service layer 204. The core/common utilities 262 may include a metadata service 264 that obtains the static metadata for the services 234-244. The metadata service 264 includes a collaboration template adapter 266 and the one or more collaboration templates 260.

The functionality of the controllers 220-230, services 234-244, adapters 246-256, and metadata service 264 is described in more detail below. The controllers 220-230, services 234-244, adapters 246-256 and core/common utilities 262, such as the metadata service 264, may be stored in the memory of the PDC system and encoded with data representing one or more computer programs that can cause the computer processor of the PDC system to perform the functionality of the PDC application described herein.

The external systems layer 206 includes a set of libraries, services and configurations to adapt external services 268, 270, 272, 274 and/or 232 for process-driven collaboration. For example, the external systems layer 206 may include a collaboration API library, which includes a set of pre-configured libraries and starter code to allow collaboration capabilities from multiple vendors to be embedded into any application. The external systems layer 206 may also include BPM configurations that include code and configurations built within various BPM vendor suites to connect the particular BPM to the service layer 204. The external services include collaboration-facilitating applications 274 that PDC application embedded into or linked to from an existing business application.

In one example of a client implementation, PDC system services may include the following consulting and implementation services for the client: Analysis of where/how collaboration can be embedded into the process to enhance it; Implementation of PDC application; and Integration of PDC application into client's BPM, ESB, and core business application.

To accelerate the implementation, the system may also provide the following items to the client: High Performance Business Process with collaboration embedded into it; PDC application, including adapters for various BPM suites, such as, for example, Pega®, IBM®, Oracle®, or other BPM suites; and Pre-configured integration into collaboration tools from various vendors.

Figure 3:
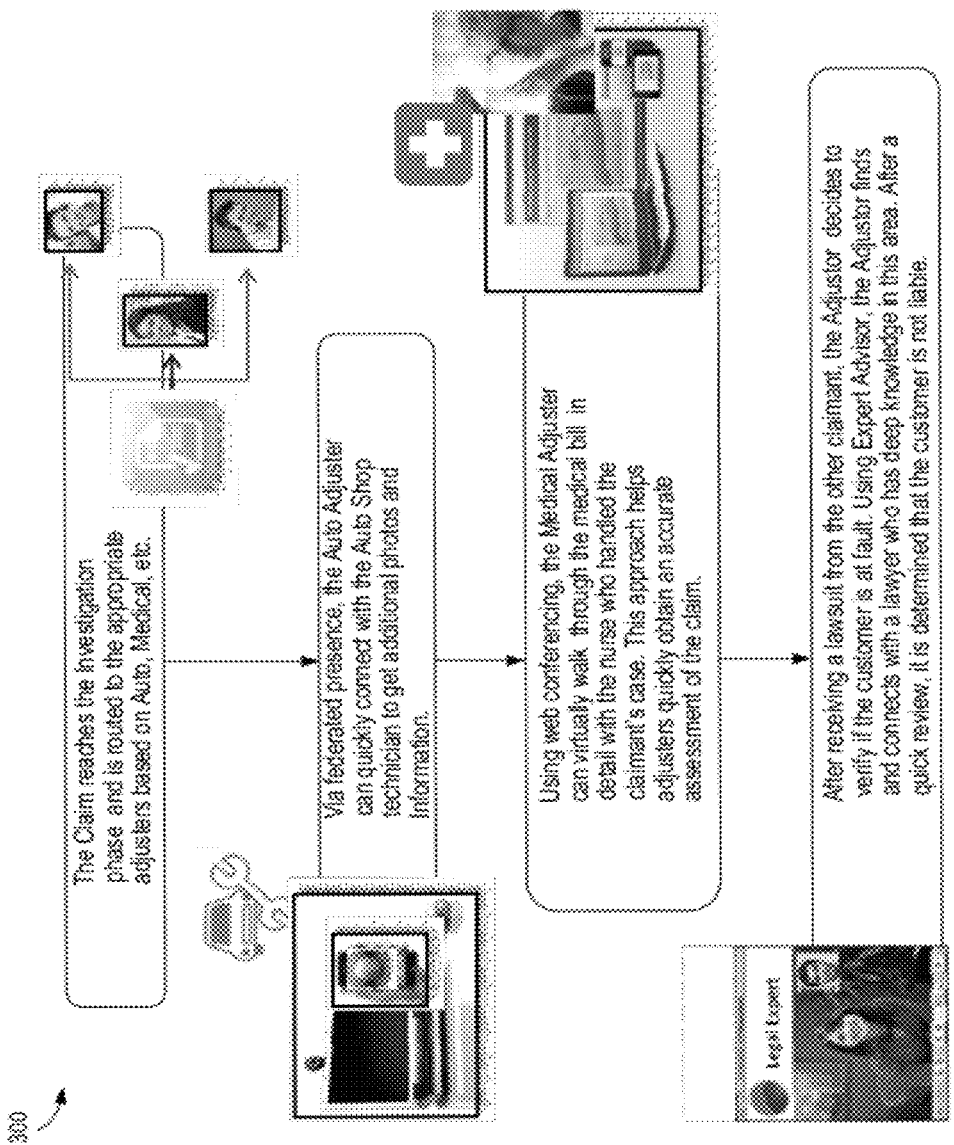
FIG. 3 shows an example of a business scenario that may be enhanced by the PDC application.

FIG. 3 shows an example of a business scenario 300, i.e., an insurance claim process, that may be enhanced by the PDC application. The PDC application integrates the needed collaboration tools and resources into the client's existing business application, tracks where the client is in the process, and prompts or otherwise makes available the tools and resources corresponding to the client's current activity.

Figure 4:
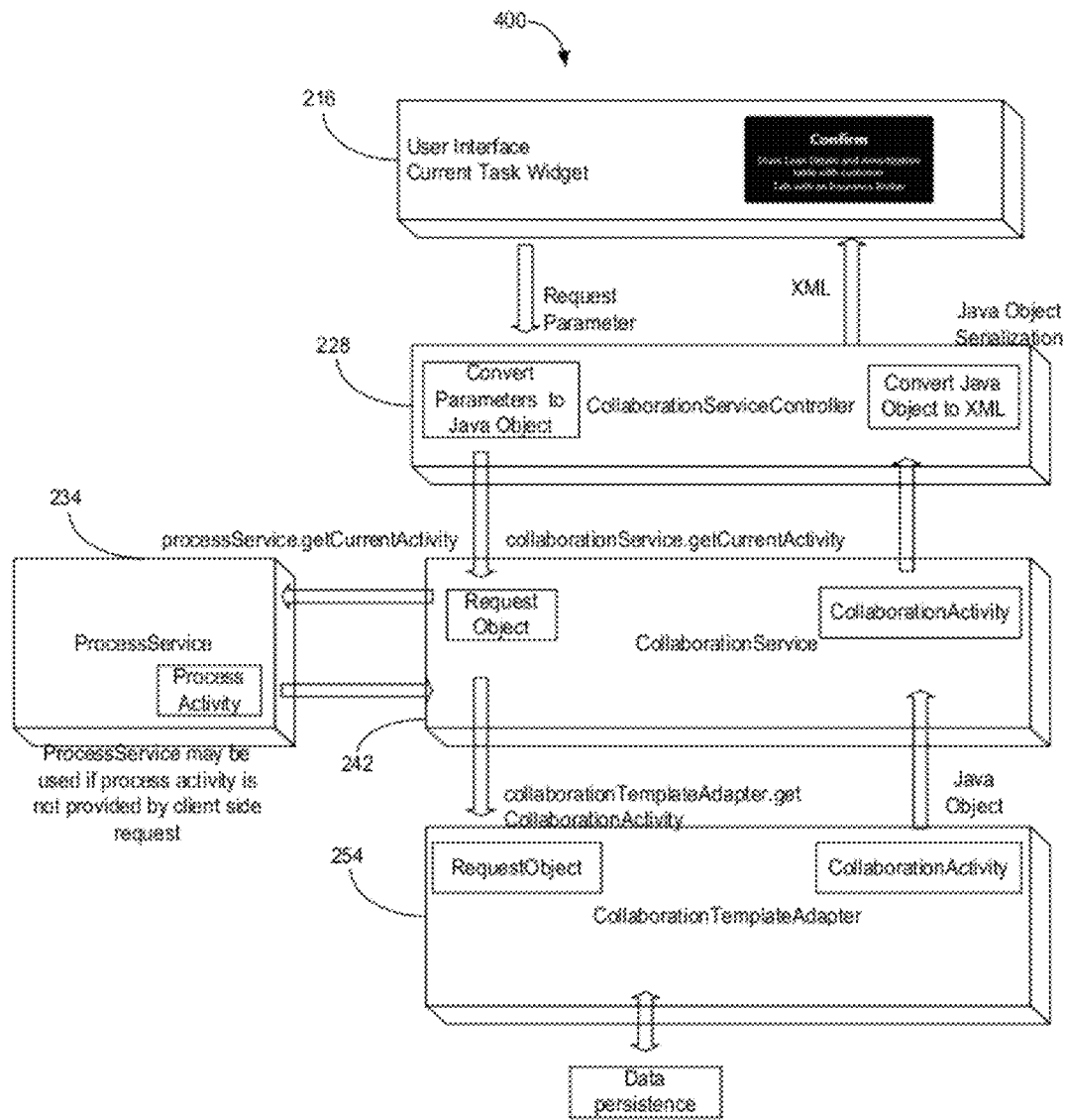
FIG. 4 shows an example of a method and process flow by which the PDC application tracks a current business process activity.

FIG. 4 shows an example of a method and process flow 400 by which the PDC application achieves this functionality. In particular, FIG. 4 shows a BPM-specific process flow 400 by which the PDC application may recommend specific collaboration activities based on the current activity/task of a business application.

The PDC application requests the current activity within the Business Process from the PDC CollaborationServiceController 228. The PDC application may be configured to detect a change in business activity and request the new current activity when such a change is detected. The PDC application may also be configured to periodically request the current activity and when the current activity is returned, determine whether the current activity has changed. The PDC application may use the PDC UI Current Task Widget to the request the current activity. The PDC application, using the CollaborationServiceController 228, converts the UI request to a Java CollaborationRequest object and calls the CollaborationService 242 for further processing. If a current process activity ID is not provided as part of the request from the PDC UI, the PDC application requests, using the CollaborationService 242, the current process activity ID from the ProcessAdapter 246 through the ProcessService 234. The PDC application, using the ProcessAdapter 246, interacts with the BPM 258 to return the ID of the current process activity.

The current process activity ID is passed to the PDC application, and in particular, to the CollaborationService 242. The PDC application, using the CollaborationService 242, queries the CollaborationTemplateAdapter 266 of the metadata service 264 for the collaboration calls and associated static metadata for this current process activity ID. The static metadata may include contextual keywords and recommended collaboration activities associated with the current process activity. The keywords may include descriptors, tags, phrases or other searchable [blank] that can be used to improve search results returned to the related expert/feeds/documents/etc. widgets. For example, if the relevant business process relates to mortgage services, a keyword may include "mortgage" as static metadata such that the keyword search for relevant experts, documents, feeds, etc. includes the term "mortgage." The recommended collaboration activities in the collaboration template may include a list of activities that are relevant to the current process activity.

The PDC application, using the CollaborationService 242, maps the business process obtained from the BPM to the set of collaboration activities that are to be pushed to the PDC UI. The collaboration calls are returned to the CollaborationServiceController 228 of the PDC application and then to the PDC UI Current Task Widget 216 for display.

The disclosed methods, processes, programs, and/or instructions may be encoded in a signal-bearing medium, a computer-readable medium such as a memory, programmed within a device such as on one or more integrated circuits, or processed by a controller or a computer processor. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

The various components of the PDC architecture 200 shown in FIG. 2 are described in more detail below.

UI Components Layer

The UI components layer 202 of the PDC architecture includes the Current Task, Relevant Documents, Relevant Experts, Relevant Feeds, Process Guidance widget, and Activity Feed widgets. Each may be configured through an administration console.

Figure 5:
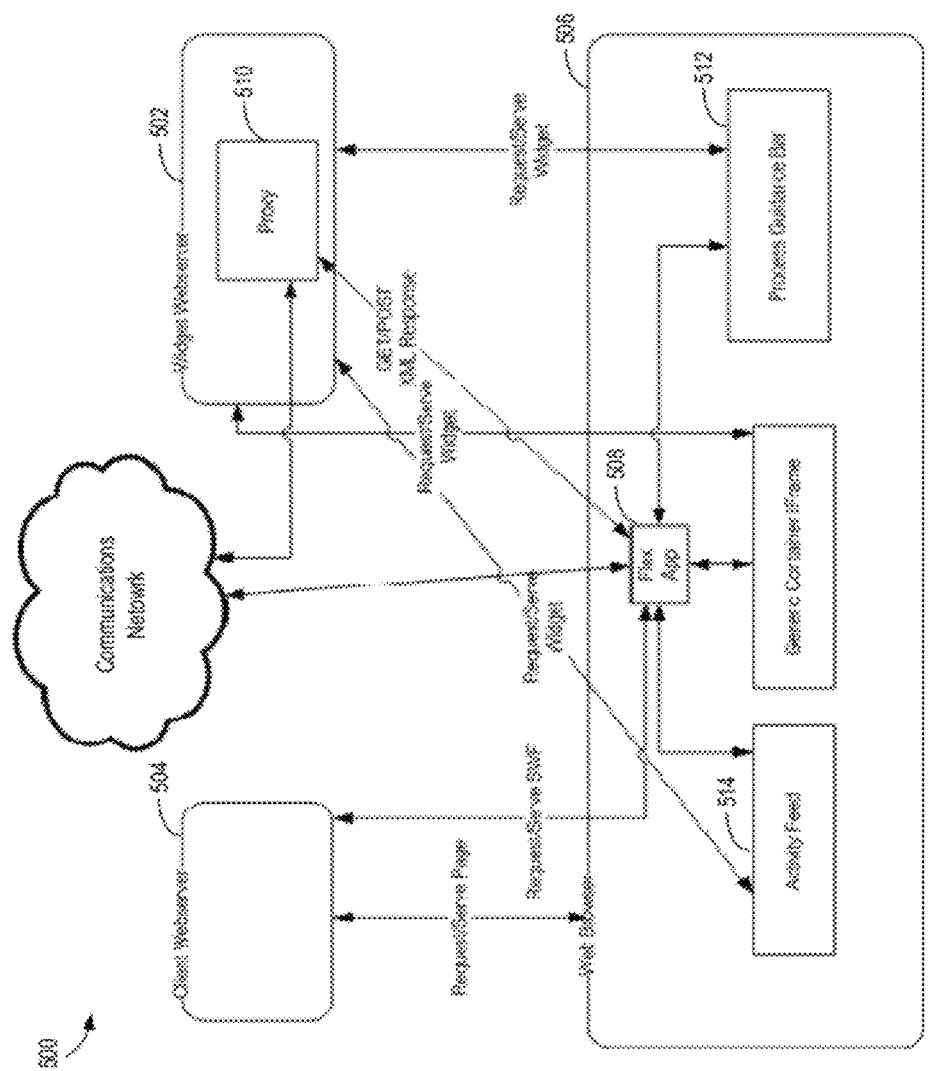
FIG. 5 shows an exemplary architecture of the UI components of a PDC application.

FIG. 5 shows an exemplary architecture 500 of the UI components of a PDC application. The architecture 500 includes a widget webserver 502, client webserver 504, and web browser 506 that may communicate over a communications network. The widget webserver 502 may be a back-end web-server used to host the widget JavaScript files corresponding to the widgets shown and described in FIG. 2. The client webserver 504 corresponds to a client business application into which the process-driven collaboration is integrated.

The communications network may be any private or public communications network or combination of networks. The communications network may be configured to couple one computing device, such as a server, system, database, or other network enabled device, to another device, enabling communication of data between the devices. The communications network may generally be enabled to employ any form of computer-readable media for communicating information from one computing device to another. The communications network may include one or more of a wireless network, a wired network, a local area network (LAN), a wide area network (WAN), a direct connection, such as through a Universal Serial Bus (USB) port, and may include the set of interconnected networks that make up the Internet. The communications network may implement any communication method by which information may travel between computing devices. For the sake of explanation, the architecture 500 is described as used in a network environment, but the architecture 500 may also operate outside of the network environment.

i) JavaScript Libraries

The PDC UI may utilize the jQuery library. It may also utilize a menu widget, which is based on jQuery, for the process guidance bar. The menu widget may be found at http://www.filamentgroup.com/lab/query_ipod_style_and_flyout_menus/.

ii) JavaScript Class Namespacing

JavaScript files used in the application described herein may be namespaced to avoid naming collisions. This may be accomplished by making all properties and functions members of an over-arching object called PDC. The existence of this object may be checked for, and created as needed, at the top of each JavaScript file. Table 1 provides an example of a JavaScript file.

TABLE 1

```
Example JavaScript File:
if (PDC == null || typeof(PDC) != "object") {
    var PDC = new Object( );
}
```

TABLE 1-continued

```
PDC.TestClass = function( ){
    if(this instanceofPDC.TestClass){
        //initialize properties here
    }
    else{
        return new PDC.TestClass( );
    }
}
PDC.TestClass = {
    init : function( ){
``` iii) Base JavaScript Files

The PDC UI may be delivered through a collection of JavaScript-based widgets. A back-end web-server 502 may be used to host the widget JavaScript files. A file, PDCBase.js, may be used to load the other JavaScript files and classes.

TABLE 2

| Name | Type | Description |
|---|---|---|
| currentProcess | Object | A PDC.Process object that contains the current process. It is set any time a new process is loaded. |
| currentPGBar | Object | A PDC.PGBar object that contains the process guidance bar instance. |
| taskWidget | Object | A PDC.TaskWidget object that contains the current task widget. |
| currentToolsList | Array | An array that contains the current tools for the toolbox. |
| currentToolbox | Object | A PDC.Toolbox object that contains the toolbox widget. |
| currentTaskid | Var | A variable containing the ID of the current task. |
| baseURL | String | The base URL of the page containing the widgets |
| widgetURL | String | The URL of the server that is hosting the widget JavaScript files. | iv) Methods swfReady( )—called when the cross-domain Flex SWF is loaded and initialized; also initiates a call to the back end to pull down the current process.

changeCurrentTask(taskId)—updates the current task in the PGBar and current task widget.

getCurrentTask( )—calls a back end service that returns the ID of the process' current task; also passes a callback to gotCurrentTask.

gotCurrentTask( )—uses the XML parser to parse the response from getCurrentTask; also passes the retrieved current task ID to changeCurrentTask.

getProcessWithId(var PID)—utilizes PDC.XDRequest.makeHTTPRequest to retrieve the process XML from the process guidance back-end service; also passes the callback gotCurrentProcess, which is called by the Flex app once the process XML is retrieved.

gotCurrentProcess(text)—used as a callback from getProcessWithId; takes text as an argument, which holds the XML text for the process; passes this text to the PDC.XMLParser.parseProcess, which returns a PDC.Process object. This process is passed to the PGBar, which prints out the process guidance menus. It is also triggers a call to the back end to pull down the current task in this process.

v) Loading the Widgets

When a client 504 wishes to incorporate the PDC UI into their web site, they may insert a piece of JavaScript code that loads the appropriate JavaScript file from the widget web-server 502. Table 3 provides an example. When the browser 506 loads the JavaScript, it may utilize the Document Object Model (DOM) to construct the widget.

TABLE 3

Example:
<script type="text/javascript"
src="http://www.pdcwidgets.[hostdomain].com/PDCBase.js"></script> vi) Performing Cross-Domain AJAX Calls

The browser 506 security model may prohibit use of XMLHTTPRequest (which is the basis for AJAX) calls to domains other than the original source of the page. Therefore, the widget may make traditional AJAX calls to the domain from which the containing webpage is served. The PDC UI makes AJAX-style calls to various different tools, often hosted on different domains. To implement this ability, a small Flex application 508 and a proxy server 510 may be utilized.

vii) Flex Application 508

A small Flex application 508 may be loaded on the page and may be given 0 px height and width, in order to make the application 508 invisible to the user. The Flex SWF may be hosted on the same domain as the webpage that contains the widgets. When the widget makes an AJAX call, it calls a JavaScript method that utilizes the external interface of Flex to make a Flex method call. This Flex method creates an HTTP request, executes the request, and returns the results by calling a JavaScript method. The Flex application 508 may have one source file and the following methods:

public function initApp( ):void—sets up the external interface for the application, creating a callback named "makeHTTPRequest."

public function makeHTTPRequest(url:String, method:String, params:String, callBack:String):void—takes four strings—url, method (GET or POST), params, and callback; creates aURLLoader and URLRequest; sets the method for the request according to the method parameter; sets the request parameters to those contained in the params string; executes the request and listen for completion of the request; and upon completion, utilizes the external interface to call a JavaScript method named callBack, with the returned response as a parameter.

viii) Cross Domain XML Files

In order for the Flex application 508 to make cross-domain HTTP requests, the server receiving the request deploys a cross-domain XML file. This file grants permission for cross-domain requests to the domain from which the flex application 508 is served. If the Flex application 508 was being served by http://www.[clientdomain].com, for example, and wanted to make a request to https://www.[hostdomain].com, then a crossdomain.xml would be located on the [hostdomain] server 502 with the following content:

TABLE 4 crossdomain.xml:
<?xml version="1.0"?>
<!DOCTYPE cross-domain-policy SYSTEM "http://www.macromedia.com/xml/dtds/cross-domain-policy.dtd">
<cross-domain-policy>
  <allow-access-from domain="http://www.[clientdomain].com" />
</cross-domain-policy> ix) Proxy

A back-end proxy 510 may also be used, such as if the target server of the cross-domain call is unable or unwilling to deploy a cross-domain xml file. It may run as a Java servlet and may be deployed on an Apache Tomcat web-server containing a cross-domain file. The back-end proxy 510 may accept GET or POST requests. When the back-end proxy 510 receives a request, it may inspect the request for anactionTargetURL parameter. The back-end proxy 510 may then construct a GET or POST request (depending on what it received), add any remaining parameters from the original request that it received (other than the actionTargetURL parameter), direct the request to the URL specified in the actionTargetURL parameter, and execute the request. The back-end proxy 510 may then forward the response from the request back to the original requestor.

x) PDCXDRequest.js

The file PDCXDRequest.js may implement the class PDC.XDRequest. It may be responsible for interfacing with the Flex application 508 to make HTTP calls. It may include the following methods:

getFlexApp(appName)—gets the Flex object from the DOM. Table 5 provides an example.

TABLE 5

Example:
functiongetFlexApp(appName)
{
  if (navigator.appName.indexOf ("Microsoft") !=-1)
  {
  return window[appName];
  }
  else
  {
  returndocument.getElementById(appName);
  }
} makeHTTPRequest(url, method, params, callBack)—calls a method in the Flex application 508 by the same name, which may create and execute an HTTP request with the specified parameters. It may also take a JavaScript method to be used as a callback when the request is completed. Table 6 provides an example.

TABLE 6

Example:
functionmakeHTTPReqeust(url, method, params, callBack){
  getFlexApp('PDCFlexApp').makeHTTPReqeust(url, method, params, callBack);
} xi) XML Schema

The ProcessServiceController 220 may return XML to the PDC UI. The XML may be constructed using the following elements (with their attributes and children):

(1) Process

<Process id="" name="">
  <Steps>[a series of Step elements]</Steps>
</Process>

(2) Step

<Step id="">
  <Name></Name>
  <Description></Description>
  <ImageURL></ImageURL>
  <HelpPageURL></HelpPageURL>

-continued

```
<SubSteps>[a series of Step elements]</SubSteps>
</Step>
```

(3) PostProcessingAction

```
<PostProcessingAction id="">
    <Name>[the name of the action you want taken]</name>
    <Options>[the options to be used in association with the action you're taking]</options>
</PostProcessingAction>
```

PostProcessingAction define what action is taken when a user interacts with the Step or SubStep and may be implemented using LaunchTool. The LaunchTool PostProcessingAction may take the following options:

Container—Identifies what container the tool should be launched in. Can be "window," for a new browser window, or "dialog," for a jQuery dialog box.

ContainerTitle—The title to assign to the window or dialog box.

URL—The url to be opened in the container

Height—The height of the container

Width—The width of the container x—The x coordinate of the container y—The y coordinate of the container AutoClose—Set to 'true' if the window being opened should be closed immediately (such as when launching an xmpp client).

(4) Tool: defines the specific collaboration tool that may be used

```
<Tool id="">
    <Name></Name>
    <URL></URL>
    <ImageURL></ImageURL>
    <HelpPageURL></HelpPageURL>
</Tool>
```

(5) Hierarchy

The process guidance service returns an XML response including the above elements, in the following hierarchy: 1) Process; 2) Steps; then 3) Substeps.

xii) General JavaScript Classes

Several JavaScript classes may be utilized by the different UI components. Each may reside in a separate JavaScript file and be selectively loaded and utilized as needed. The JavaScript files may include:

(1) PDCProcess.js

This file contains the class PDC.PDCProcess and includes properties according to Table 7.

TABLE 7

| Name | Type | Description |
| --- | --- | --- |
| id | Number | The unique id of the PDCProcess |
| name | String | The name of the PDCProcess |
| steps | Array | An array of PDCStep objects that make up the process |

(2) PDCStep.js

This file contains the class PDC.Step and includes properties according to Table 8.

TABLE 8

| Name | Type | Description |
| --- | --- | --- |
| Id | Number | The unique id of the PDCStep |
| Name | String | The name of the PDCStep |
| Description | String | A description of the PDCStep |
| imageURL | String | A URL containing an image to display alongside this item |
| helpPageURL | String | A URL containing help information about this step. |
| Substeps | Array | An array of PDCStep objects containing the substeps of this step |

(3) PDCTool.js

This file contains the class PDC.Tool and includes properties according to Table 9.

TABLE 9

| Name | Type | Description |
| --- | --- | --- |
| Id | Number | The unique id of the PDCTool |
| Name | String | The name of the tool |
| imageURL | String | A URL containing an image to display alongside this item |
| helpPageURL | String | A URL containing help information about this step. |
| url | String | The full URL to use as the source of the generic container iframe |

(4) PDCExpert.js

This file contains the class PDC.Expert and includes properties according to Table 10.

TABLE 10

| Name | Type | Description |
| --- | --- | --- |
| Id | Number | The unique id of the PDCExpert |
| Name | String | The name of the expert |
| Expertise | String | The expertise of this person |

(5) PDCDocument.js

This file contains the class PDC.Document and includes properties according to Table 11.

TABLE 11

| Name | Type | Description |
| --- | --- | --- |
| id | Number | The unique id of the PDCDocument |
| name | String | The name of the document |
| description | String | A description of this document |
| type | String | The file type of the document |
| url | String | The full URL where the document can be accessed |
| imageURL | String | The full URL where the accessory image for this document can be found |
| helpPageURL | String | A URL containing help information about this document. |

(6) PDCTip.js

This file contains the class PDC.Tip and includes properties according to Table 12.

TABLE 12

| Name | Type | Description |
| --- | --- | --- |
| Id | Number | The unique id of the PDCTip |
| Name | String | The name of the tip |
| Description | String | A description of this tip |
| PostProcessingActions | Array | An array of PDC.PostProcessingActions to perform when the user clicks on this tip |
| imageURL | String | The full URL where the accessory image for this document can be found |
| helpPageURL | String | A URL containing help information about this document. |

(7) PDCXMLParser.js

This file contains the class PDC.XMLParser and includes methods for parsing the XML returned by the process guidance and tasks back-end services. The file utilizes jQuery's built in XML functionality to parse the schema defined above and place the information into the appropriate PDC objects, which are also defined above.

xiii) Process Guidance Bar 512

(1) Overview

The process guidance widget provides insight into the user's current activity/step in the process. The PDC application allows the user to view the entire business process, the steps within the process, and the associated collaboration activities within a given step. The PDC UI also allows the user to click on any of the collaboration activities.

Figure 6:
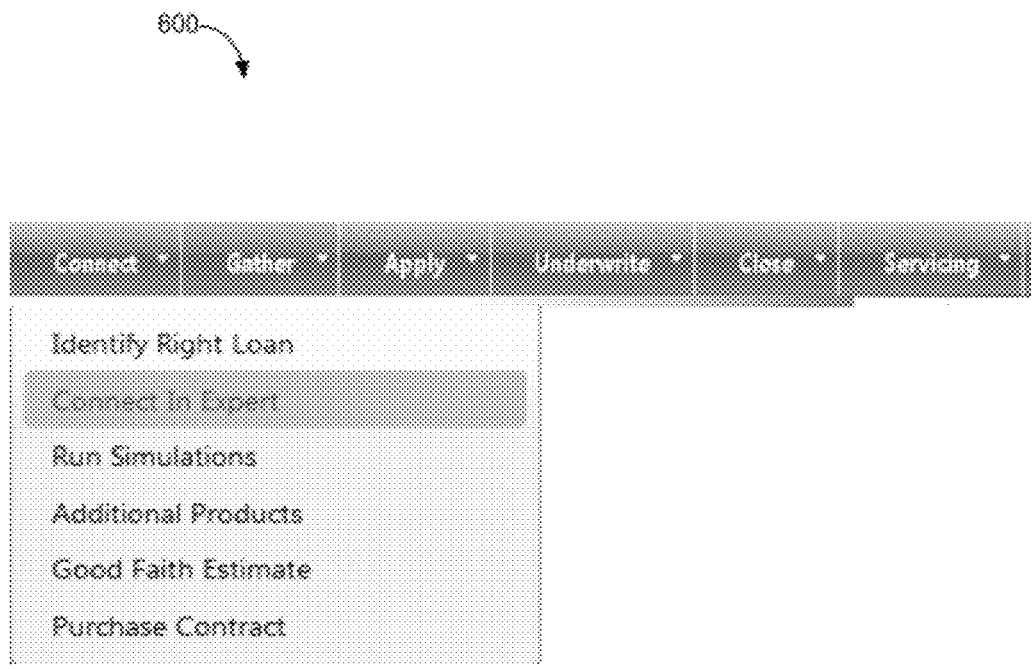
FIG. 6 shows an example of a process guidance bar provided by a process guidance widget.

The process guidance bar 512 may be contained in a JavaScript file named PDCPGBar.js, may be in the namespace PDC.PGBar, and may be hosted on the widget web-server. It may use the cross-domain strategy described above to retrieve the current process XML from the ProcessServiceController 220, which will be loaded into iPod-style menus, or the like, with breadcrumbs, which can be found, for example, at the following url: http://www.filamentgroup.com/lab/jquery_ipod_style_and_flyout_menus/. The menu may be modified to contain a small image next to each menu item, which may in turn be populated with the image from the item's imageURL property. FIG. 6 shows an example of a process guidance bar 600 provided by a process guidance widget, such as the process guidance widget 208 shown in FIG. 2.

(2) PDC.PGBar Methods init( )—This method constructs the PGBar. This method also retrieves all available processes from the process-guidance service and places them into a 'switch process' drop-down box. When the selected process in this drop down changes, a call to loadProcessWithId is made with the newly selected process.

doTaskId (vartaskId)—When one of the tasks is selected in the menu, it calls this method, which utilizes PDC.XDRequest to make an HTTP request with the parameters defined in the corresponding PDCTask object. This tells the BPM to perform whatever collaboration sequence is associated with this task and return a list of PostProcessingActions to be performed.

displayCurrentTask( )—This method utilizes markCompletedSteps to highlight the path to the current task in the PGBar.

markCompletedSteps(step)—Recursive method that iterates through the current process until it finds the current task. Any steps prior to the PDC.currentTask are marked as complete.

printProcessAsMenu(process)—takes a process object and prints it out as an unordered list, which will be utilized by the menu plugin to display the process menus.

printSubstepsAndTasksAsMenuItems(step)—utilized by printProcessAsMenu to print out steps and tasks for a process xiv) PDC Toolbox (1) Overview The PDC UI may also provide a PDC toolbox. The PDC toolbox is a drop-down menu that opens when the user clicks the toolbox icon. The PDC toolbox may be contained in the file PDCToolbox.js and will be in the namespace PDC.Toolbox. The PDC toolbox may utilize a stack menu plugin, which is contained in the file stack-2.js.

(2) PDC.ToolboxMethods init( )—manipulates the DOM to construct the actual widget. Makes a call to the toolbox back-end service, which returns a list of collaboration tools to display, as well as information about how the tool should be opened.

getToolsList( )—calls the PDC toolbox back-end service, which returns an XML list of tools to be displayed in the toolbox.

gotToolsList(text)—used as a callback from getToolsList's call to the back-end service. Uses the XML parser to parse the list of tools and then calls printToolsList to print out the list of tools. Also sets up the stack menu.

printToolsList(toolsList)—prints out the tools as an unordered list, with styles to work with the stack menu plugin.

xv) Task Widget (1) Overview

A tasks widget provides another drop down menu (similar to those used in the PGBar), but can also be docked on the right side of the business application window. It may be contained in the file PDCTaskWidget.js and will implement the namespace PDC.TaskWidget.

(2) PDC.Tasks Methods init( )—This method constructs the tasks widget. It will then make a call to changeCurrentTask to display the widgets' current task.

changeCurrentTask(taskId)—starts the process of pulling down documents, experts, and tips/alerts for the given task ID. Does so by calling getDocumentsForTask constructMenu—constructs the task widget menu. Prints out the tips, experts, and documents in list form to be used in the menu.

getDocumentsForTask(taskId)—utilizes XDRequestto pull down a list of documents for the given task ID. Passes gotDocumentsForTask as a callback gotDocumentsForTask(text)—Called upon completion of the getDocumentsForTask request. Parses the XML response and puts it into the documentsList array. Also triggers getTipsForTask.

printDocumentsList(documentsList)—Prints the documentsList array in list form for use in the task widget menu.

getTipsForTask(taskId)—utilizes XDRequest to pull down a list of tips for the given task ID. Passes gotTipsForTask as a callback gotTipsForTask(text)—Called upon completion of the getTipsForTask request. Parses the XML response and puts it into the tipsList array. Also triggers getExpertsForTask.

printTipsList(tipsList)—Prints the tipsList array in list form for use in the task widget menu.

getExpertsForTask(taskId)—utilizes XDRequest to pull down a list of experts for the given task ID. Passes gotExpertsForTask as a callback gotExpertsForTask(text)—Called upon completion of the getExpertsForTask request. Parses the XML response and puts it into the expertsList array. Also triggers construction of the widget menu.

printExpertsList(tipsList)—Prints the expertsList array in list form for use in the task widget menu.

createExpertPopup(expert)—Takes an expert object and creates a tooltip popup that displays when you hover over an expert's name in the task widget.

showExpertPopup(expert)—Displays the popup for the given popup.

closeExpertPopup(expert)—Hides the popup for the given expert mouseInsideBox(left, top, height, width, mouseX, mouseY)—Checks to see if the mouse pointer is inside the given box. Returns true if it is, false otherwise.

Used in the expert popup to check if the mouse pointer was moved into the popup when it is moused out of the expert name.

(3) PDC.Tasks Properties

Table 13 shows PDC.Tasks properties.

TABLE 13

| Name | Type | Description |
| --- | --- | --- |
| documentsList | Array | An array of documents for the task widget. |
| expertsList | Array | An array of experts for the task widget. |
| tipsList | Array | An array of tips and alerts for the task widget. | xvi) Tool Launcher (1) Overview

When a user performs some action that triggers a launch-Toor PostProcessingAction (such as through the process guidance bar or the task widget), the tool is opened using the PDC.ToolLauncher.

(2) PDC.ToolLauncher Methods launchTool(options)—Takes an options object which contains the following options: container, height, width, x, y, URL, name, and autoClose. It then opens either a new browser window or a jQuery dialog box containing an iframe and points the new frame to the URL specified in the options.

xvii) Activity Feed 514

An activity feed widget, such as, for example, the activity feed widget 218 shown in FIG. 2, provides through an activity feed 514 displayed on the PDC UI a running log of all the activities that have occurred in the business application. The logged activities may include collaboration activities taken, documents uploaded, and any external feeds that the user would like to include.

Service Layer

The service layer of the PDC architecture includes the controllers, core services, and adapters for providing the Process Guidance/Current Task, Relevant Feeds/Experts/Docs, and collaboration tool integration.

Figure 7:
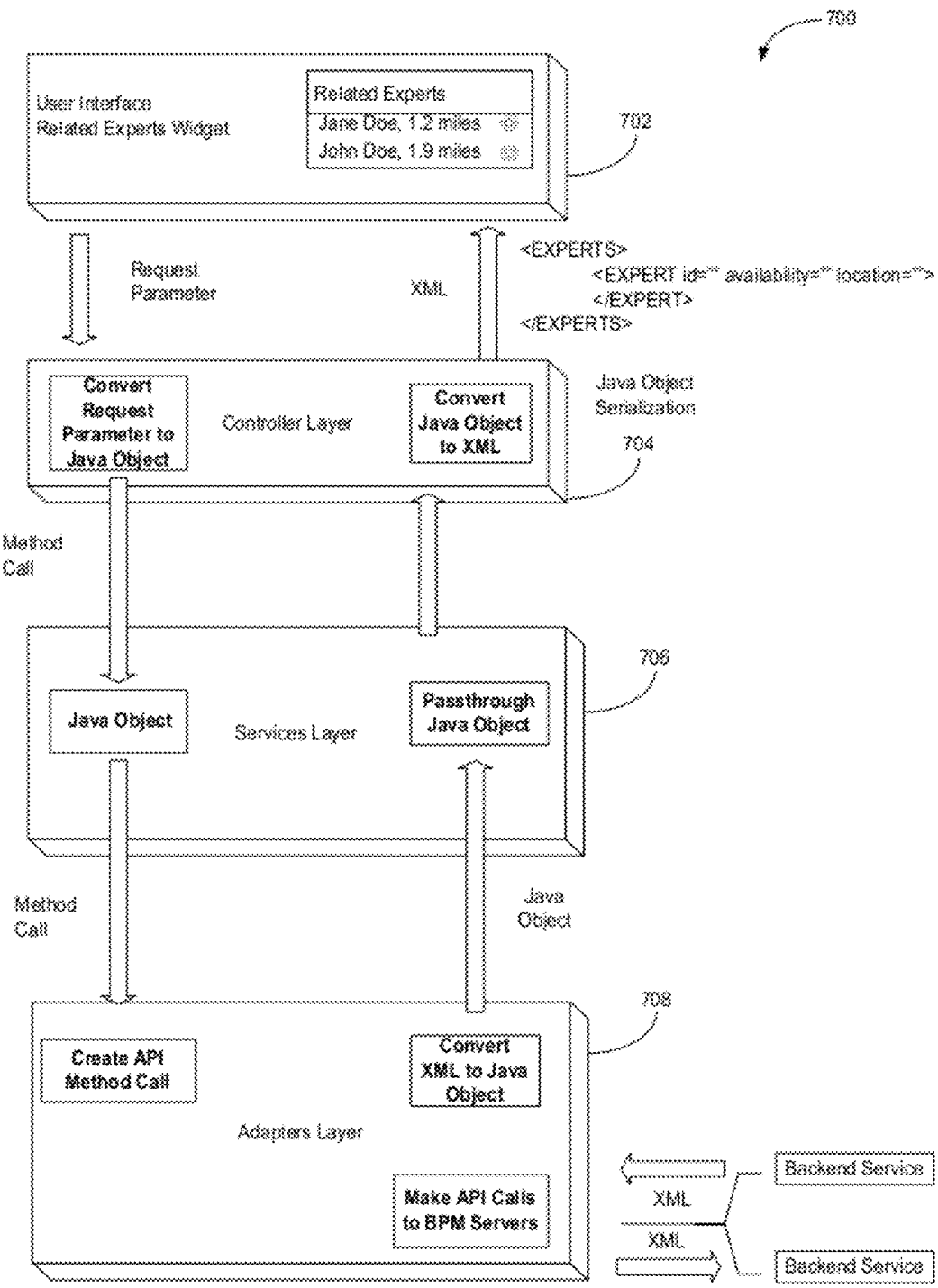
FIG. 7 shows an example of a method and general process flow by which the PDC application provides a collaboration widget to an existing business application.

FIG. 7 shows an example of a method and general process flow 700 by which the PDC application provides a collaboration widget 702 to an existing business application. In particular, FIG. 7 shows an example of how the PDC application updates a related expert widget, such as the related expert widget 214. The PDC application, using the widget 702, requests the current activity of the business application from a controller layer 704, which may correspond to one or more of the controllers 220-230 shown in FIG. 2. In the example of a related experts widget, PDC application uses the widget 702 to request the current activity of the business application from an expert service controller, such as the ExpertServiceController 226. The controller layer 704 of the PDC application converts the UI request into a java object and calls a services layer 706, which may correspond to one or more of the services 234-244 shown in FIG. 2, and in particular, to the ExpertService 240.

The services layer 706 of the PDC application makes a method call to the adapters layer 708 and obtains a current process activity ID. The adapters layer 708 of the PDC application may correspond to one or more of the adapters 246-256 shown in FIG. 2, and in particular, to the ExpertAdapter 252. The adapters layer 708 creates an API method call that is made to a BPM server. Metadata is generated and obtained based on the current activity/task engaged in by the user of the business application. Based on the metadata, the PDC application identifies the relevant expert, document, feed, etc. data to be pushed to the widget 702. In FIG. 7, the process flow is shown to push relevant expert information to the PDC UI, and in particular, to the related expert widget.

Figure 8:
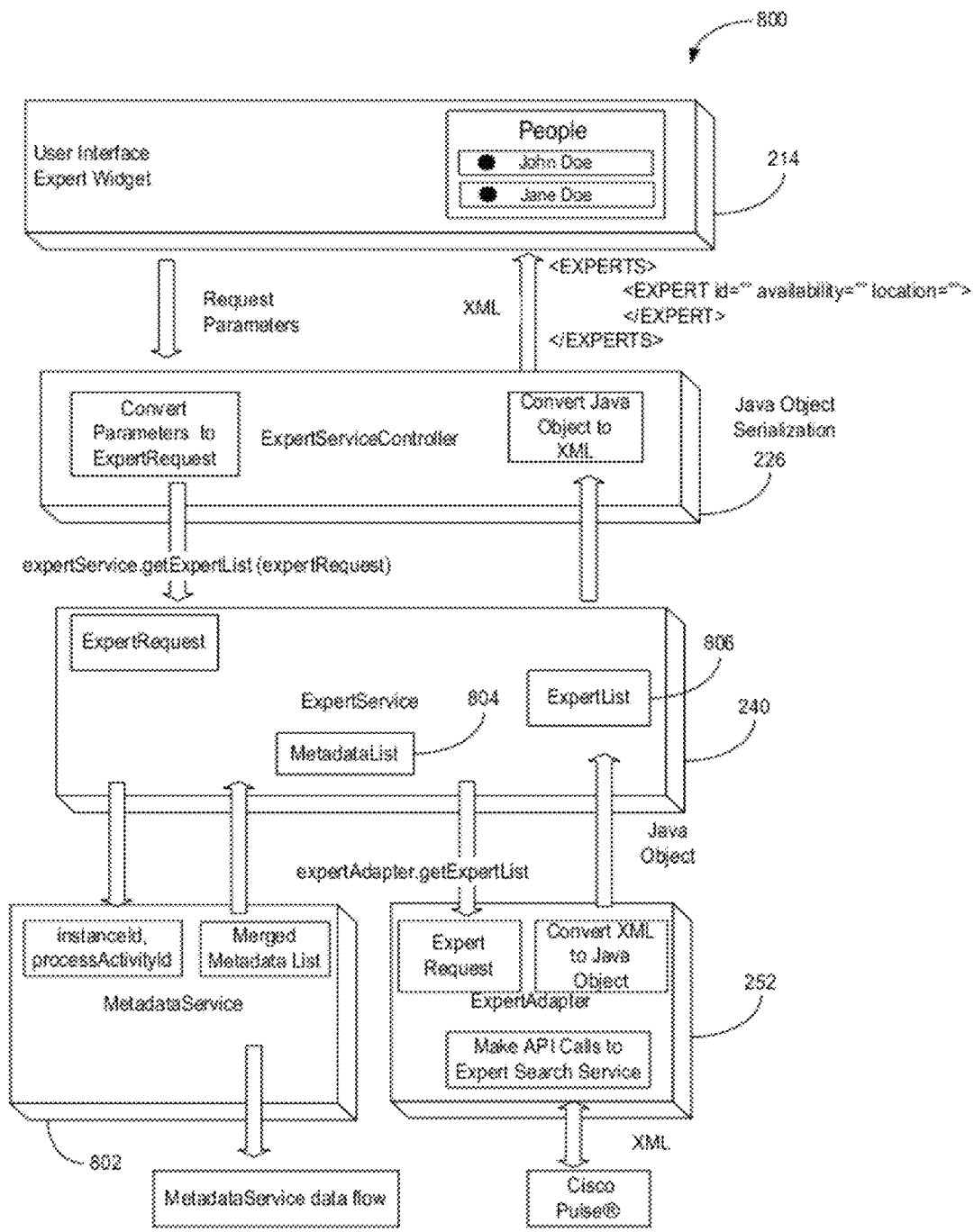
FIG. 8 shows a method and process flow by which the PDC application may provide the expert widget to an existing business application.

FIG. 8 shows a method and process flow 800 by which the PDC application may provide the expert widget to an existing business application. The process flow 800 generally follows the process flow shown and described in FIG. 4. The PDC application, using the expert widget 214, requests expert identification parameters. The PDC application, using the ExpertServiceController 226, converts the parameter request to an Java ExpertRequest object and calls the ExpertService 240. The PDC application, using the ExpertService 240, obtains an activity identification that identifies the current activity. The PDC application, using the ExpertService 240, requests metadata associated with the current activity from a MetadataService 802, such as the metadata service 264. The PDC application, using the MetadataService 802, obtains a metadata list 804 that is passed to the ExpertService 240. Operation of the MetadataService 802 is shown and described in more detail in FIG. 9.

Based on the metadata list 804 and the activity identification, the PDC application makes an expert request to the ExpertAdapter 252. The PDC application, using the ExpertAdapter 252, obtains an expert list 806 by making calls to external Expert Search services, such as Cisco Pulse® depicted in FIG. 8. This list includes an identification of experts relevant to the current activity being performed in the business application, based on the metadata 804 and/or the activity identification. The expert list 806 is pushed to the PDC interface may be information based on the current activity/task the user is engaged in with the business application. The identity of the relevant experts is pushed to the PDC interface to be integrated with the business application.

Figure 9:
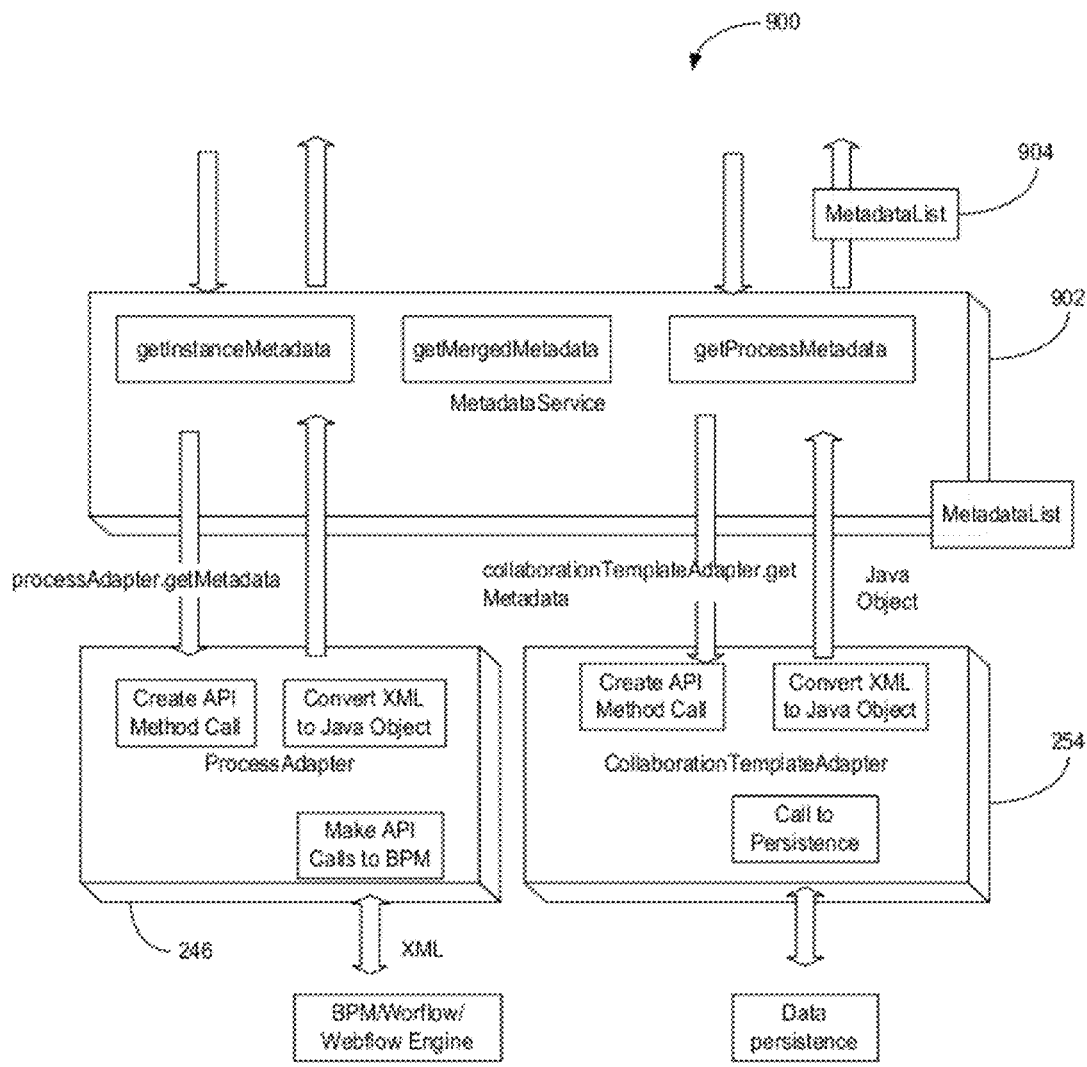
FIG. 9 shows a method process flow by which the PDC application obtains the metadata used to identify the relevant experts, documents, feeds, collaboration tools, etc.

FIG. 9 shows a method and process flow 900 by which the PDC application obtains the metadata used to identify the relevant experts, documents, feeds, collaboration tools, etc. Each of the expert, document, or related feed widgets makes a call to its respective service (ExpertService, DocumentService, RelatedFeedService). The service then queries the MetadataService 902, such as the metadata service 264, to obtain the appropriate metadata for the current process activity. The MetadataService 902 queries the ProcessAdapter 246 for (a) dynamic metadata that is generated from the BPM and (b) current activity if it was not provided in the request from the client UI. The dynamic metadata extracted from the BPM as result of the query may include data or searchable keywords retrieved from the BPM that are related to actions being taken in the business process. The MetadataService 902 then queries the CollaborationTemplateAdapter 266 for static metadata that is stored in the collaboration template based on the Current Activity ID.

The MetadataService 902 then combines the dynamic and static metadata into a merged metadata list 904 and returns the information to the respective Docs/Feeds/Experts services. Each service, in turn, then searches for relevant Docs/Feeds/Experts, respectively, using the search criteria based on the metadata. The MetadataService 902 may merge the dynamic and static metadata by combining each metadata list into a single list. As an alternative, the MetadataService 902 may merge the dynamic and static metadata based on historical queries and the corresponding results.

Figure 10:
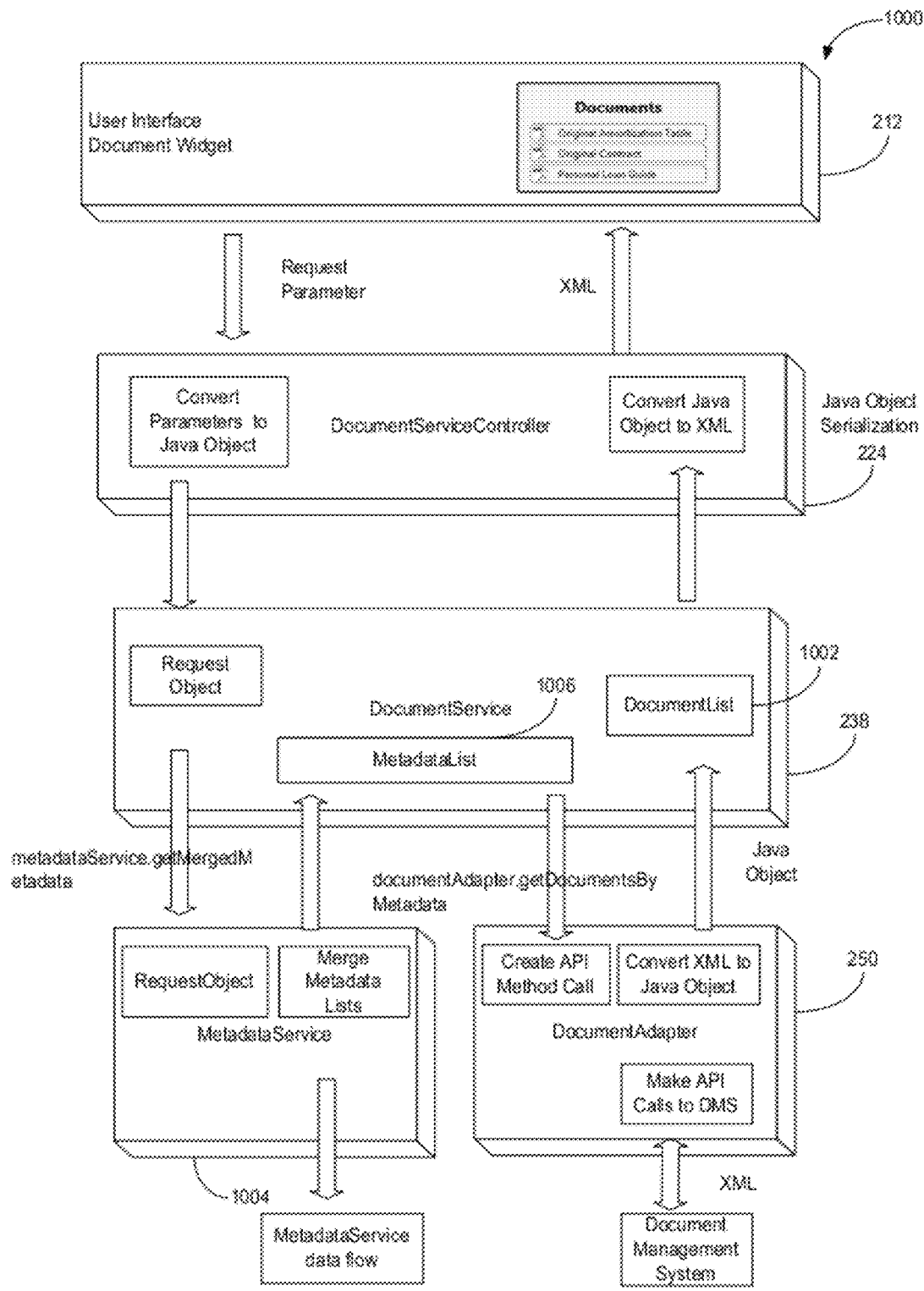
FIG. 10 shows a method process flow by which the PDC application may provide the documents widget to an existing business application.

FIG. 10 shows a method and process flow 1000 by which the PDC application may provide the related documents widget 212 to an existing business application. Similar to the expert widget shown and described in FIG. 8, metadata generated based on the current activity/task is used to identify the relevant documents 1002 to be pushed to the PDC interface.

The PDC application, using the related documents widget 214, requests document identification parameters. The PDC application, using the DocumentServiceController 224, converts the parameter request to an Java DocumentRequest object and calls the DocumentService 238. The PDC application, using the DocumentService 238, obtains an activity identification that identifies the current activity. The PDC application, using the DocumentService 238, requests metadata associated with the current activity from a MetadataService 1004, such as the MetadataService 902 shown in FIG. 9. The PDC application, using the MetadataService 1004, obtains a metadata list 1006 in the manner described above with respect to FIG. 9 that is passed to the DocumentService 238.

Based on the metadata list 804 and the activity identification, the PDC application makes a document request to the DocumentAdapter 250. The PDC application, using the DocumentAdapter 250, obtains the document list 1002 by making calls to external an Document Management System. This list may include an identification and location of documents relevant to the current activity being performed in the business application, based on the metadata 1006 and/or the activity identification. The document list 1002 is pushed to the PDC interface may be information based on the current activity/task the user is engaged in with the business application. The identity and location of the relevant documents is pushed to the PDC interface to be integrated with the business application. Links to the relevant documents may also be pushed to the PDC interface to be integrated with the business application.

Figure 11:
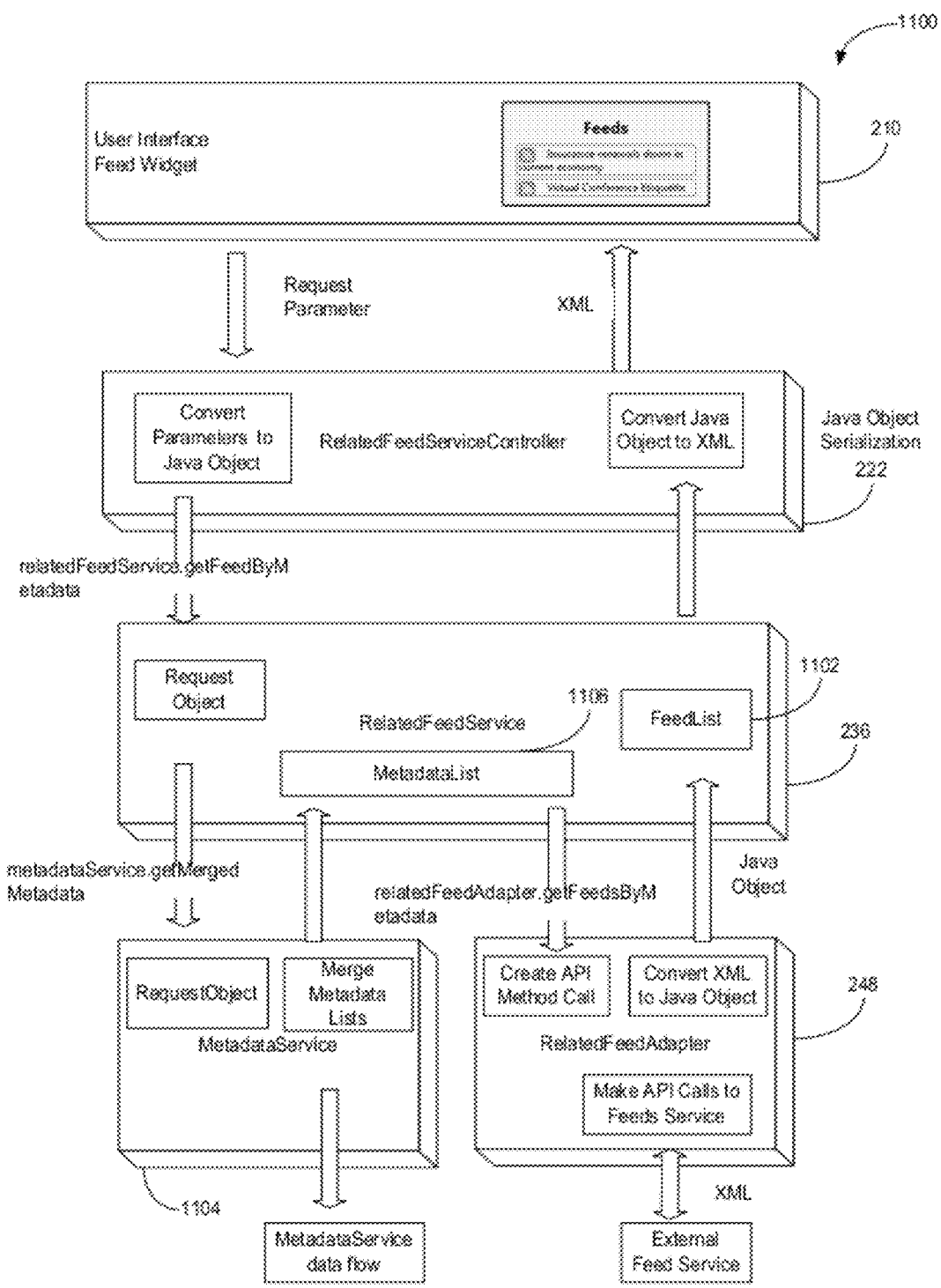
FIG. 11 shows a method process flow by which the PDC application may provide the related feed widget to an existing business application.

FIG. 11 shows a method and process flow 1100 by which the PDC application may provide the related feed widget to an existing business application. The related feed list 1102 pushed to the PDC interface are based on metadata generated based on the current task/activity. The related feed list 1102 may include an identification and location (such as urls) of social media, articles, websites, company intranet notices, collaboration tool feeds, etc. related to the current activity/task.

The PDC application, using the related feed widget 212, requests document identification parameters. The PDC application, using the RelatedFeedServiceController 222, converts the parameter request to an Java RelatedFeedRequest object and calls the RelatedFeedService 236. The PDC application, using the RelatedFeedService 236, obtains an activity identification that identifies the current activity. The PDC application, using the RelatedFeedService 236, requests metadata associated with the current activity from a MetadataService 1104, such as the MetadataService 902 shown in FIG. 9. The PDC application, using the MetadataService 1104, obtains a metadata list 1106 in the manner described above with respect to FIG. 9 that is passed to the RelatedFeedService 236.

Based on the metadata list 804 and the activity identification, the PDC application makes a document request to the RelatedFeedAdapter 248. The PDC application, using the RelatedFeedAdapter 248, obtains the related feed list 1102 by making calls to external an external feed service that provides external feeds. This list may include an identification and location of feeds relevant to the current activity being performed in the business application, based on the metadata 1006 and/or the activity identification. The related feed list 1102 is pushed to the PDC interface may be information based on the current activity/task the user is engaged in with the business application. The identity and location of the relevant feeds is pushed to the PDC interface to be integrated with the business application. Links to the relevant feeds may also be pushed to the PDC interface to be integrated with the business application.

Figure 12:
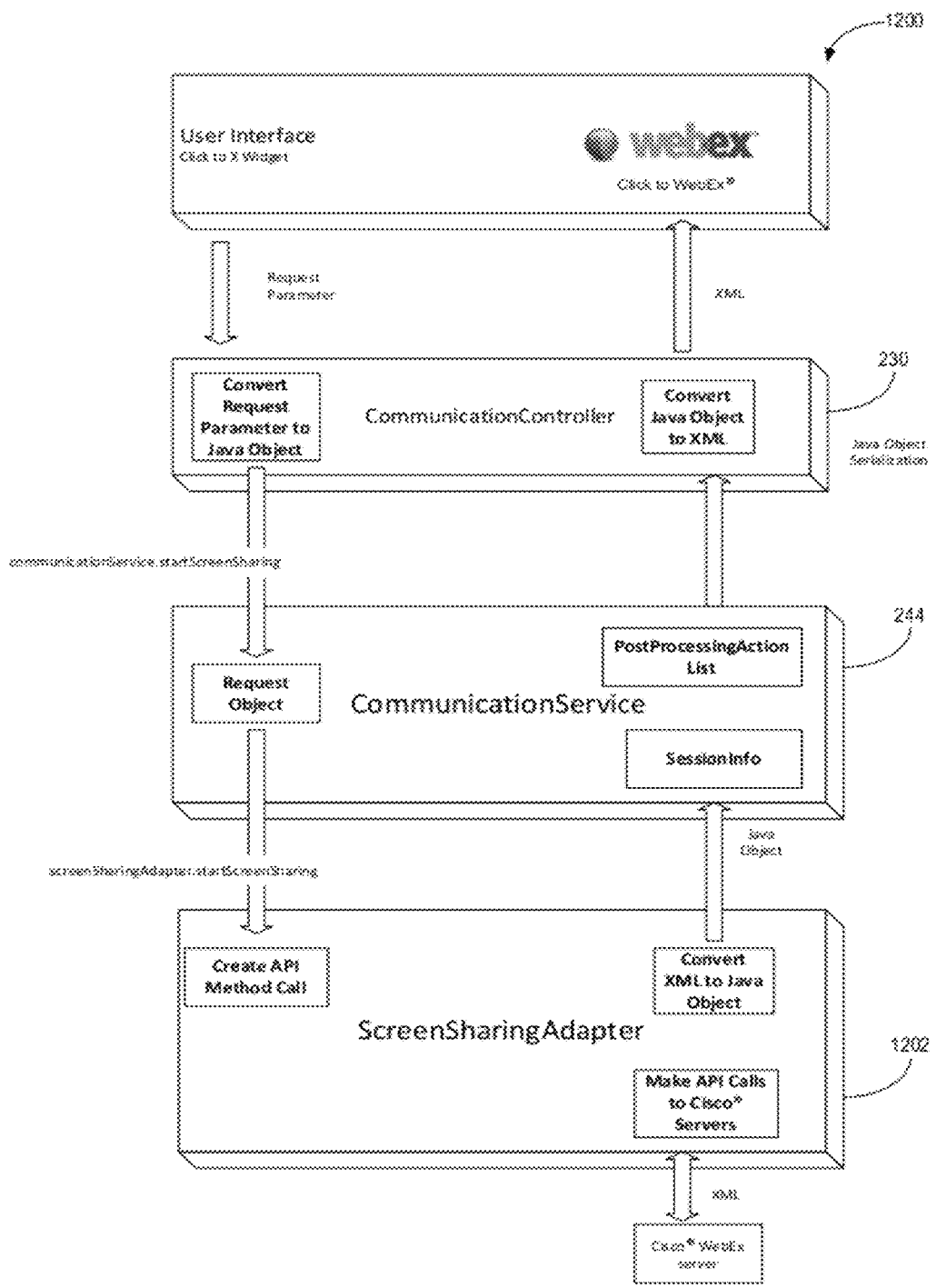
FIG. 12 shows a method process flow by which the PDC application may provide an external collaboration tool, such as WebEx®, to the business application.

FIG. 12 shows a method and process flow 1200 by which the PDC application may provide the external collaboration tool, WebEx®, to the business application. It will be appreciated that the process flow of FIG. 12 also applies to other external collaboration tools. The PDC application identifies a generic, abstract collaboration action, such as 'screensharing', and allows for the implementation of this action via multiple vendor collaboration tools. In the example of Webex®, the Cisco Webex® tool is implementing the 'screensharing' collaboration action. The PDC application provides the appropriate interfaces to the external collaboration tool and pushes the relevant information to the PDC services and UI. In the example of WebEx®, the session information and url to launch screen sharing are pushed to the PDC interface.

i) Common Utility Library
(1) Exception Handling

Figure 13:
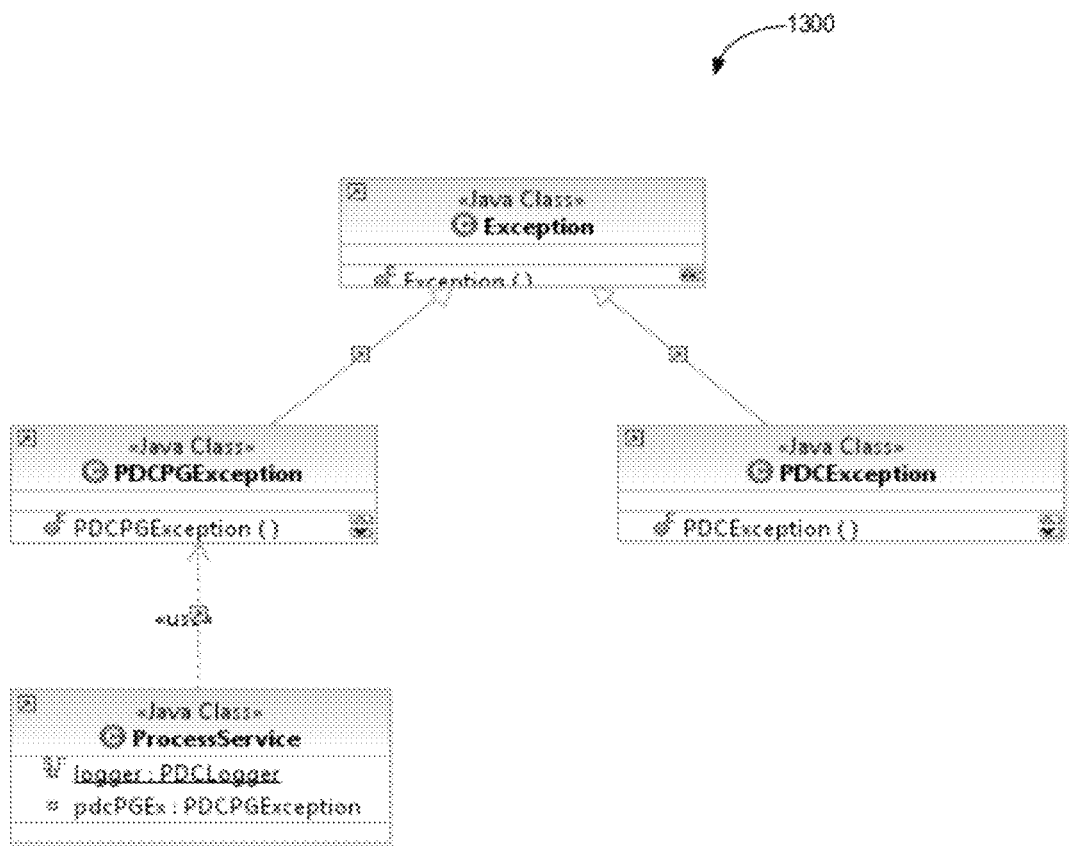
FIG. 13 shows a logical view of exception handling for the PDC Service Layer.

FIG. 13 shows a logical view of exception handling 1300 for the PDC Service Layer. The PDC application handles abnormal, unexpected events or extraordinary conditions that may occur at runtime in the service layer using an exception framework. A custom exception class may be implemented to handle application error. The exception class may encapsulate application/functionality specific error codes and error messages in service layer i.e. in Controller, Service and Adapter.

Business logic will be wrapped around the 'try', 'catch' blocks identified below for any unexpected events to be caught and any resources that needs to be released will be handled in 'finally' block. The 'catch' block creates the component (Process Guidance, Activity Feed etc.) specific exception instance and throws to the presentation layer hosting the UI Components; for any other system exception generic 'Exception' may be thrown to the presentation layer.

The service layer logs an exception stack traceusing logger.error( ) method before throwing the custom exception to the presentation layer. Table 14 provides an example.

TABLE 14

Example : PDCPGException in Service layer:
public class PDCPGException extends Exception{
    public PDCPGException( ){
        super( );
    }
    public PDCPGException(Exception exp){

TABLE 14-continued

```
        super(exp);
    }
    public PDCPGException(String message){
        super(message);
    }
}
Example : ProcessService handling exception in Service layer:
.
.
.
private static final PDCLogger logger = new
PDCLogger(ProcessService.class);
public ProcessService( ) throws PDCPGException {
try {
    //here exception might be encountered.
} catch (Exception ex) {
    logger.error(" SQLException ", ex);
    throw new PDCPGException("Exception while invoking the Process
Adapter", "PDCPGERR001");
}
finally {
    .
    .
    .
    }
}
```

(1) Logging

Figure 14:
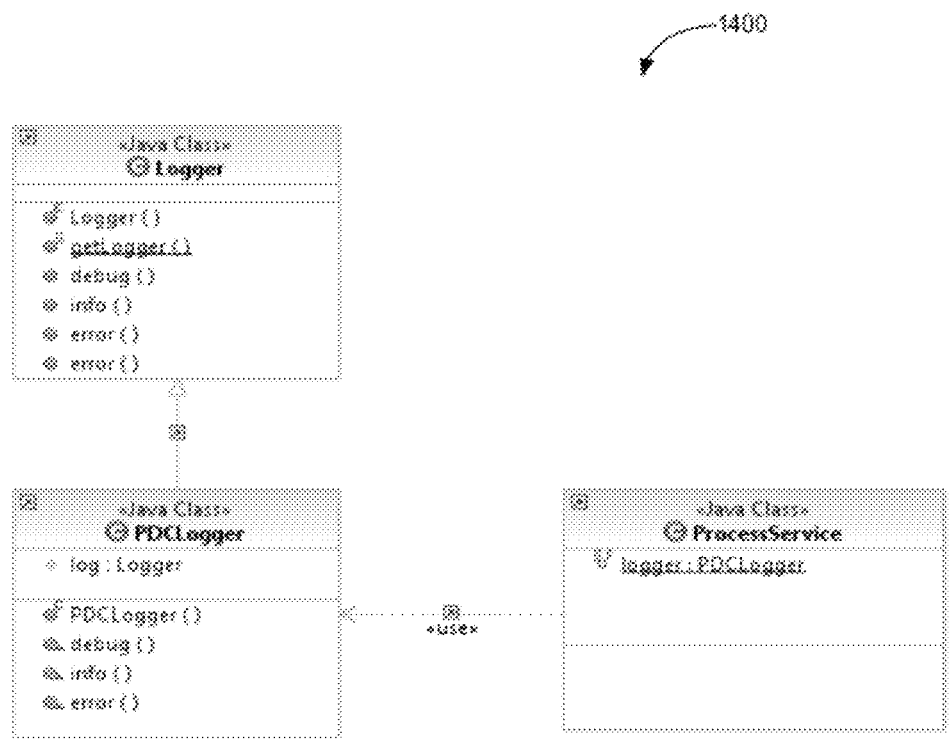
FIG. 14 shows a logical view of a logging mechanism for the PDC application.

FIG. 14 shows a logical view of a logging mechanism 1400 for the PDC application. The PDC application may use Apache's log4j, a java based configurable tool for logging the trace files that will define log file name, pattern, log file content format, file size, etc.

The PDC application may use three of the six logging level provided by the log4j: (1) ERROR—Logging runtime errors or unexpected conditions; (2) INFO—Logging runtime events, critical dataset/message ID; and (3) DEBUG—Detailed information on the flow through the system, this should be switched off in production environment for better performance of application.

The PDC application may use a property file based logging mechanism for logging the application-specific traces. The following are the steps that may be used to configure and log message:

1. Download the log4j.jar from the following url: http://logging.apache.org/log4j/1.2/download.html.
2. Copy the log4j.jar file to WEB-INF/lib folder of the application.
3. Create a property file PDCApplicationLog4j.properties and place it under appConfig/log/ folder on the server, with the entries shown in table 15. A similar set of entries may be created in separate property files as mentioned above for each of the PDC functionalities such as context, related feeds, etc.

TABLE 15

```
log4j.category.com.pdcapp=debug, PDCProccessGuidance
log4j.appender. PDCProccessGuidance =
org.apache.log4j.RollingFileAppender
log4j.appender. PDCProccessGuidance.File=logs/pdcprocessguidance.log
log4j.appender. PDCProccessGuidance.Append=true
log4j.appender. PDCProccessGuidance.MaxFileSize=10000KB
log4j.appender. PDCProccessGuidance.MaxBackupIndex=7
```

TABLE 15-continued

```
log4j.appender. PDCProcessGuidance.layout=
org.apache.log4j.PatternLayout
log4j.appender.FA.layout.ConversionPattern=%d{DATE} [%-5p]
%-15c{1}: %m%n
```

4. Create a PDCLogger class for configuring the PDC logs as shown in table 16.

TABLE 16

```
public final class PDCLogger extends Logger {
    private final String LOG4J_PROPERTIES_PATH =
    "appConfig/log/ "; protected Logger log = null;
    public PDCLogger(Class userDefinedClass, propertyFileName) {
        super(userDefinedClass.getName( ));
        if (log == null) {
            URL url = ClassLoader.getSystemResource
LOG4J_PROPERTIES_PATH + propertyFileName);
            PropertyConfigurator.configure(url);
        }
        log = Logger.getLogger(userDefinedClass);
    }
    /**
     * Logs the message in debug level.
     *
     * @param message
     */
    public void debug(Object message) {
        log.debug(message);
    }
    /**
     * Logs the message in info level.
     *
     * @param message
     */
    public void info(Object message) {
        log.info(message);
    }
    /**
     * Logs the message in error level.
     *
     * @param message
     */
    public void error(Object message) {
        log.error(message);
    }
}
```

5. Instantiate the logger and log the messages by adding logger statements to log the messages in a called method of ProcessService class. Table 17 provides an example.

TABLE 17

```
Example ProcessService file with log statements:
public class ProcessService {
    private static final PDCLogger logger = new
PDCLoggerProcessService.class)
    .
    .
    public Object processMethod( ) {
        .
        .
        .
        logger.debug("Process Id: " + methodName);
        logger.info("Process Id: " + methodName);
        logger.error(new Exception( ));
        .
        .
        .
    }
}
```

External Services

The external services include the collaboration API libraries and BPM/ESB configurations for BPM/ESB vendors, such as Pega® and Oracle®.

BPM Integration:

The PDC application interacts with the Business Process Management (BPM) system in order to retrieve both the current state of the business process and available documents attached to that process. Integration may be provided with the Pega®, Oracle®, IBM®, or other BPM suites. PDC determines the current state of the business process by making calls to the BPM system web API if there is one in place. If no API is available, configurations and/or code is built within the BPM system to provide the necessary data to the requesting PDC service layer. The same process occurs in order to retrieve any documents attached to the business process.

The PDC application uses the current state of the business process instance to determine the appropriate collaboration activities.

i) Collaboration Tool API Integration
ii) screen sharing capability tool, such as WebEx®
(1) Web Conferencing Services The PDC application may interface with a web conferencing service, such as, for example, Webex®, to deliver web conferencing services through a hosted service offering.

(a) URL API

The URL API is HTTP(S)-based, and provides a convenient, lightweight mechanism to provide browser-based, external hooks into the WebEx® services. The URL API is typically used in enterprise portal integrations to support basic interactions such as Single Sign-On (SSO), scheduling meetings, starting and joining simple meetings, and inviting attendees and presenters.

The URL is formed as follows http://<WebexHostedName>.webex.com/<WebexHostedName>/[m|p|o|h|c].php?AT=[Command]

where,

WebexHostedName is domain name of the hosted webex site. For our application this is ciscoacbg-dev.

m.php is Meeting Page. This service allows an authorized meeting host to schedule, delete, edit, or start a meeting.

p.php is Partner Page. This service page allows you to create a new user account on your organization's WebEx-hosted Web site. It also allows an existing authorized user to log in or log out from the hosted site.

o.php is My Webex And Enterprise Edition Page. This service allows a user to access My WebEx and Enterprise Edition site features.

h.php is Hands-on Lab Page. This service allows an authorized Training Center host to list lab names for a site, list the schedule of a lab, get detailed lab information, or check the availability of the computers in a lab.

c.php is Remote Access Page. This service allows a user to get a list of remote access computers and connect to the remote computer.

AT is the command argument.

Implementation examples are provided below:

1. User Login
   https://ciscoacbg-dev.webex.com/ciscoacbg-dev/p.php?AT=LI&WID=username&PW=password&MU=http://pdcdev.accenture.com/PDC_NGI/

2. User Logout
   https://ciscoacbg-dev.webex.com/ciscoacbg-dev/p.php?AT=LO

Figure 15:
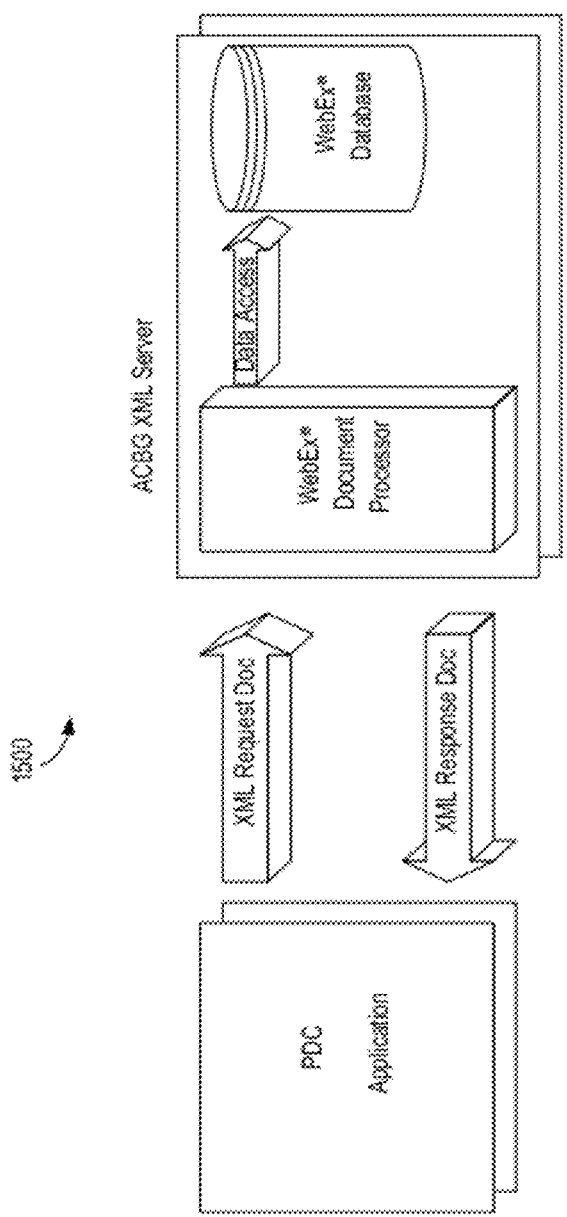
FIG. 15 shows the logical architecture for the Webex® XML Services server.

3. Start an Impromptu Meeting
   https://ciscoacbg-dev.webex.com/ciscoacbg-dev/m.php?AT=IM&PW=password 4. Invite Attendees
   https://ciscoacbg-dev.webex.com/ciscoacbg-dev/m.php?AT=AA&MK=MeetingKey&BU=BackURL&FN1=FullName&EA1=EmailAddress&FN2=FullName&EA2=EMailAddress (b) XML Web Services API The WebEx® XML API uses a Service Oriented Architecture to provide a very comprehensive set of services to external applications needing to interact with one or more WebEx® services. FIG. 15 shows the logical architecture for the Webex® XML Services server.

Tables 18-19 show the XML Services available for use in the development of the application.

TABLE 18

| XML Request | Description |
| --- | --- |
| | User Service |
| createUser | Creates a new user account |
| delUser | Deletes the user |
| getloginurlUser | Returns user's login URL |
| getlogouturlUser | Returns user's logout URL |
| getUser | Returns user details |
| lstsummaryUser | Lists summary information of user |
| setUser | Updates user's account information |

TABLE 19

| XML Request | Description |
| --- | --- |
| | Meeting Session Service |
| createMeeting | Create a meeting |
| delMeeting | Delete a meeting |
| gethosturlMeeting | Returns host's URL for starting a meeting |
| getjoinurlMeeting | Returns host's URL for joining a meeting |
| getMeeting | Returns detailed meeting information |
| lstsummaryMeeting | Lists summary of scheduled meeting |
| setMeeting | Updates a meeting information |

(2) Expert Finding Capability Tool

The PDC application may integrate with an expert finding capability tool, such as, for example, Cisco's Pulse®, to aid in selecting and returning a list of appropriate experts based on keywords that will be passed in through HTTP-based API calls. On the backend, the expert finding capability tool may use the keywords to match individual or groups of expert contacts from its internal database. Experts will then be prioritized and returned based on:

Presence
   Available (Yes/No)
   Time since last call
Geography
Organization and Role A first-identified expert may receive a notification, such as through their IM client, that their assistance is being requested. The expert may accept or deny the request through the IM. If denied, the expert finding capability tool may move on to the next identified expert and repeat the notification sequence. This may continue until an expert accepts the request. Once accepted, expert finding capability tool may return the agent ID of the expert and initiate a video conference with the requesting agent.

(3) Corporate Video Sharing Platform

The PDC application may integrate with a corporate video sharing platform, such as Cisco's Show and Share tool, to allow employees to (1) record a video or screen-recording (2) upload the recording to Show and Share's video repository (3) push related videos to the PDC Related Feeds UI widget (4) Presence The PDC application may interface with an enterprise presence service, such as Cisco's Unified Presence Server, to provide real-time information on the status of a user's presence (away, available, busy, etc).

(5) Contact Center

The PDC application may interface with an enterprise contact center, such as Cisco's Unified Contact Center for Enterprise, to allow Contact Center agents (1) to "click-to-call" from an application (2) to automatically open the relevant customer's web page when the customer calls into the Contact Center.

(6) Grapevine

The PDC application may interface with Accenture's Innovation Grapevine application to allow users to (1) add a topic (2) add an idea (3) rate an idea (4) share an idea with other users (5) push relevant 'seeds' in the PDC Related Feeds widget (7) Digital Whiteboard The PDC application may interface with a digital whiteboard tool such as, for example, Accenture's Whitespace application, to allow users to (1) add an item to a Whitespace 'board' (2) create a new Whitespace 'board' (3) push relevant 'board updates' to the PDC Related Feeds widget.

(8) Multi-Channel Communication Engine

The PDC application may interface with a multi-channel communication engine such as, for example, Backflip™, to provide multiple-channel communication options for the user—SMS, chat, audio, email It will be appreciated that other communication and collaboration tools may be implemented using the PDC Communication and Collaboration adapters.

Implementation Example

The following is an example of implementation of the PDC application in the retail banking industry. Specifically, described below is an example of PDC integration for a banking software that provides a custom interface which brings together a bank's core systems, such as Alnova, SAP and IBM BPM Suite in this example.

Figure 16:
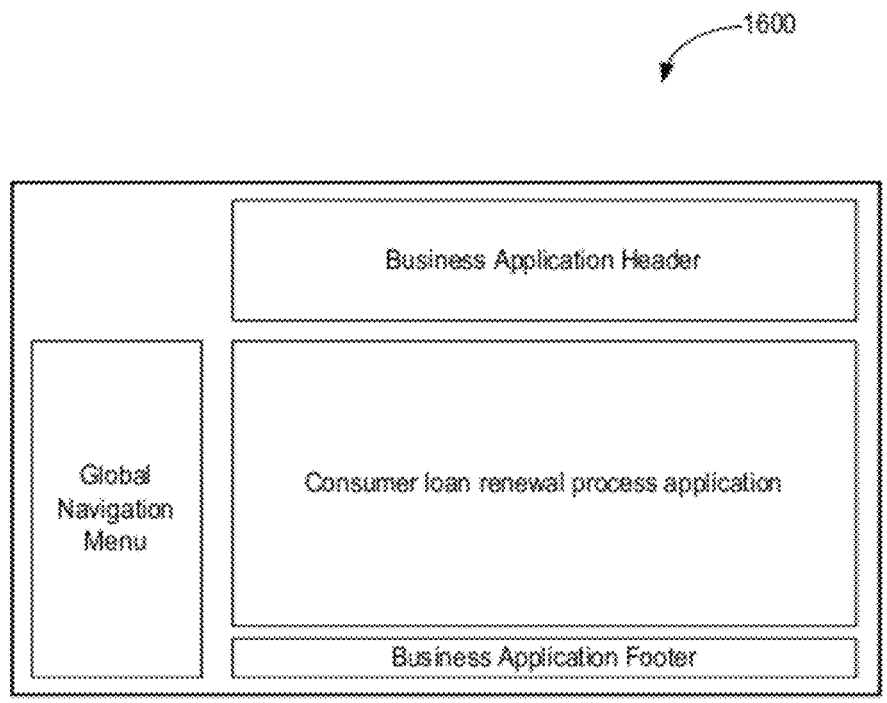
FIG. 16 shows an exemplary interface for a banking application.

FIG. 16 shows an exemplary interface 1600 for the banking application implementing the banking software. The banking software focuses on the Consumer Renewal Process. Through a series of Services Calls the banking software is able to manipulate the bank's back end systems from a single interface. The main interactions will occur in the center of the interface, a representation of which is show in FIG. 16.

For the integration of Process-driven Collaboration, the solution is decoupled from the BPM. Service calls of the banking software are used to manipulate the collaboration interfaces.

Figure 17:
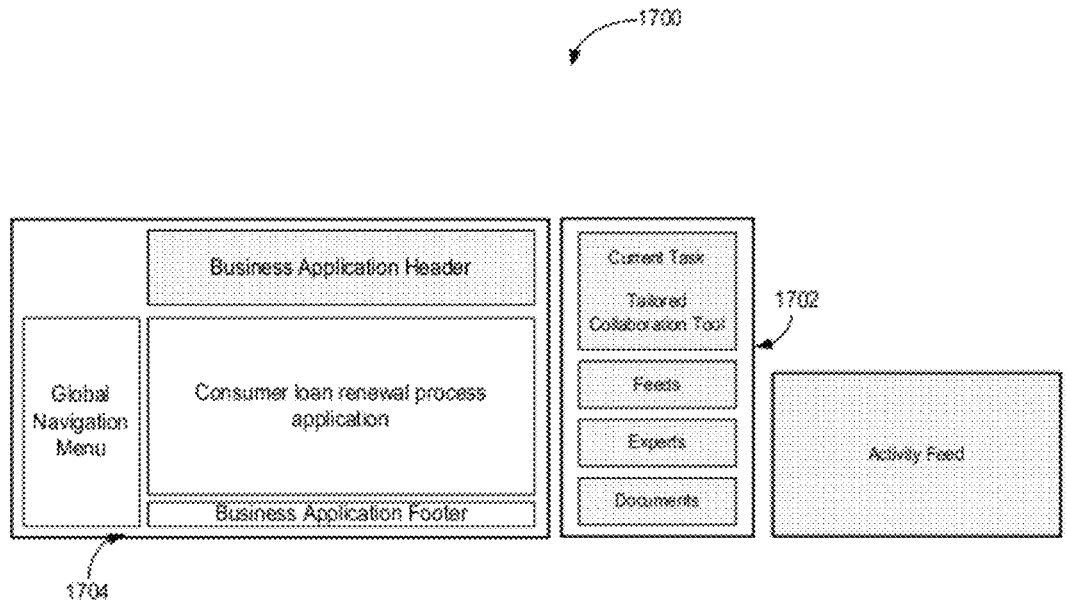
FIG. 17 shows the banking application interface of FIG. 16 enhanced by the PDC application.

FIG. 17 shows the banking application interface of FIG. 16 enhanced by the PDC application. The PDC code may be initiated from the current business application header. As shown in FIG. 17, the PDC collaboration interface 1702 may lie on top of or alongside the existing banking application 1704 interface and be able to be minimized or docked.

To populate the PDC collaboration interface, the collaboration interface utilizes an Interaction Adaptation Layer of the banking software. The PDC application may use business software's service calls in order to access the needed information. Additional service calls may be needed to populate the collaboration widgets.

Table 20 provides examples of expert methods for the Related Expert widgets.

Figure 18:
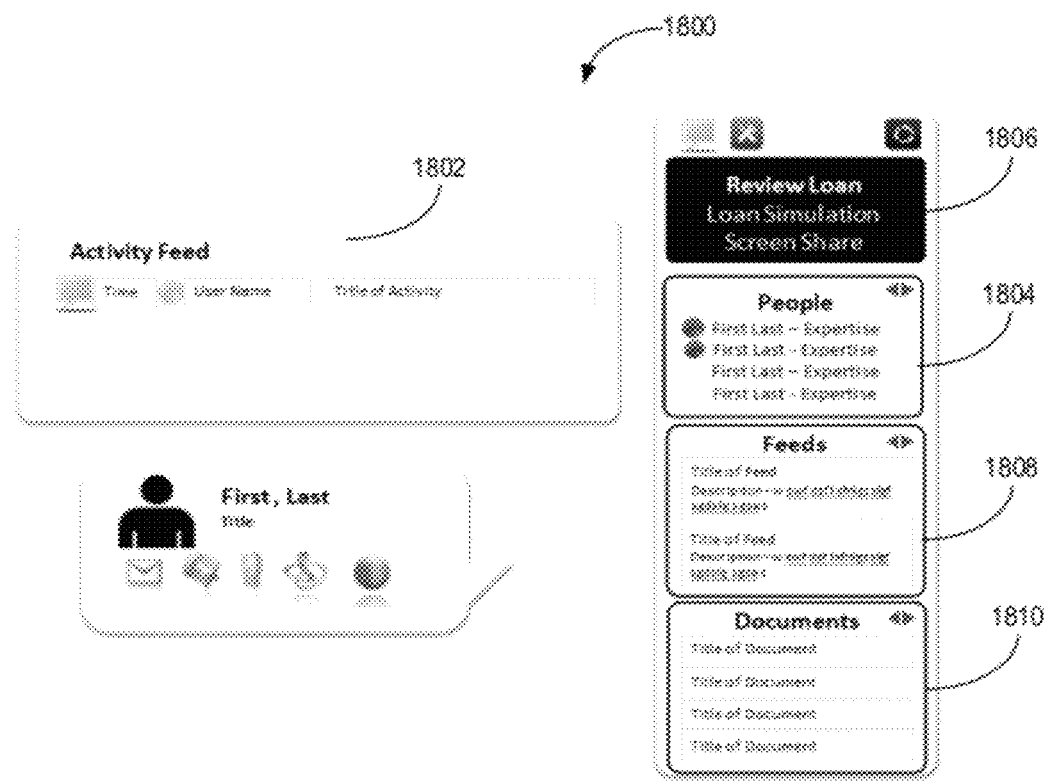
FIG. 18 shows an exemplary collaboration interface that may be integrated with an existing business application interface, such as a banking interface.

TABLE 20 getExpertList
getExpertListByPresence
getExpertListByProximity
getExpertListByCommChannel
getExpert
getExpertByPresence
getExpertByProximity
getExpertByCommChannel The following is an example of related document method. It can be both process and instance metadata: getDocumentsByMetadata The following are examples of related related Feed methods. It can be both process and instance metadata: getFeedByMetadata FIG. 18 shows an exemplary collaboration interface 1800 that may be integrated with an existing business application interface, such as a banking interface, according to the above-mentioned methods. In particular, if a banker logs into a banking application, the PDC application may pull up an activity feed 1802. As has been discussed, the PDC collaboration widgets request current activity ID from the underlying BPM.

If the banker searches for a customer, a trigger is sent to the collaboration widget that an 'identifying customer screen' is being opened. For example, the banker may be searching for a customer whose loan has come to the end. The results are returned to the Site Footer and the banker chooses the customer in the list. The following Site service calls may be utilized:

Search: CustomerService.SearchByCriteria

Select: CustomerService.GetDetails When the Banker opens an identifying customer screen, their current task will be "Search". The related experts widget displays the availability of a search for a tech support expert in cases where the banker is not getting accurate or any search result. This may be triggered by a click on "Search" in the Global Navigation Menu or once the identifying customer screen is loaded have a custom JSP code on the page which will communicate to the Related Expert Widget. If the banker enters, for example, data into the "Bank" or "Branch Fields," the PDC application captures that data and pushes it to the collaboration widget to display additional expert's 1804 specific to the bank or branch.

In this example, the banker next clicks on Search→Customer Name, and the following data is displayed via the PDC interface:

Current Task 1806: Connect With Customer;

Feeds 1808: "Prospective Customer Needs" pushed here remove from the banking application UI frees up space for other info;

Expert 1804: Expert: Visa Premier Card, Life Insurance, Loan Renewal; and

Document 1810: Previous Consumer loan documents pulled from where the business application currently uploads documents too.

When a customer is selected, a customer product list may be displayed by the banking application. An alert is displayed on the customer synthesis page. The banker clicks on it to initiate loan renewal.

PortfolioService.loadPortfolio
PortfolioService.proposeProducts

Once the banker opens the customer page, the current task widget may contain an Instant WebEx Meeting link to meet with the customer. The Related Expert widget may be populated with the Experts associated with a Products to be proposed table. If the banker clicks on "renew customer loan," the following data may be displayed via the PDC interface:

Current Task 1806: Connect With Customer
Feeds 1808: "Prospective Customer Needs" pushed here remove from the banking application UI frees up space for other info.
Expert 1804: Expert: Visa Premier Card, Life Insurance, Loan Renewal
Document 1810: Previous Consumer loan documents pulled from where FOT currently uploads documents.

Next the banker may navigate to a fulfillment screen of a banking application enhanced by the PDC application. The customer and banker provide all the mandatory information/documents.

Render: ContractService: InitiateRenewalContract→BPM: Initiate Process
OK button: ContractService: fulfillRenewalContract→BPM: Fulfill task complete When the banker gets to the fulfillment tab, the current task widget may contain Screen Sharing/Simulation. Then banker at this point can share his/her screen to discuss the details of the loan renewal with the customer. The Expert Feed 1804 may list one or more experts identified by the PDC application, such as experts on the specific product and/or an interest rate experts to help determine the appropriate interest rate. For the document the PDC application may push customer documents that already exist in the system.

If the banker clicks on the "update customer data" link, the following data may be displayed via the PDC interface:

Current Task 1806: Connect With Customer
Feeds 1808: "Prospective Customer Needs" pushed here remove from the banking application UI frees up space for other info.
Expert 1804: Expert: Visa Premier Card, Life Insurance, Loan Renewal
Document 1810: Previous Consumer loan documents pulled from where the banking application currently uploads documents.

The banker may then navigate to a customer details screen of a banking application enhanced by the PDC application.

Render: IndividualService.getDetails
OK button: IndividualService.updateCustomerDetails On this screen the banker can update the customer information. The Current Task of the PDC interface may display Set Preferred Method of Communication. If the banker clicks OK, the following data may be displayed:

Current Task 1806: Set Preferred Method of Communication
Feeds 1808: "Prospective Customer Needs" pushed here remove from the banking application UI frees up space for other info.
Expert 1804: Expert: Visa Premier Card, Life Insurance, Loan Renewal
Document 1810: Previous Personal Documents pulled from where the banking application currently uploads documents.

The banker may then navigate to a summary screen of a banking application enhanced by the PDC application. On this screen the banker may confirm the information with the customer. In the Current Task area of the PDC interface, the banker is prompted to run a simulation or share their screen if further collaboration is required to serve the customer. If the banker accepts the prompt, the following data may be displayed:

Current Task 1806: Run Loan Simulation/Share Screen
Feeds 1808: "Prospective Customer Needs" pushed here remove from the banking application UI frees up space for other info.
Expert 1804: Consumer Loan Expert
Document 1810: Previous Personal documents pulled from where the banking application currently uploads documents The banker in this example may then navigate to a document upload screen of a banking application enhanced by the PDC application. Through this screen the banker can upload documents. The PDC application may integrate a whitespace collaboration tool. In particular, the PDC interface may display the following:

Current Task 1806: Run Loan Simulation/Share Screen
Feeds 1808: Customer Whitespace—mocked
Expert 1804: Tech Support
Document 1810: documents in the place where these documents get uploaded The banker may then navigate to an amortization table of a banking application enhanced by the PDC application.

Render: FinancialService.getAmortizationTable
The PDC interface may display the following:
Current Task 1806: Run Loan Simulation/Share Screen
Feeds 1808: Customer Whitespace—mocked
Expert 1804: Expert in loan
Document 1810: ALL document in the place where these documents get uploaded The banking application may show a second summary screen of a banking application enhanced by the PDC application. On this screen the banker may review loan details and send for back office validation.

Send for Validation button:ContractService.finalizeRenewalContract

On this screen the banker may click "validate" to send an approval request to a back-office manager. A multi-channel communication engine, such as BackFlip™, may be utilized to rout the approval to the back office manager's phone. The PDC interface may display the following:

Current Task 1806: Review Loan Details with Customer
Feeds 1808: Prospective Customer Needs" pushed here remove from the banking application UI frees up space for other info.
Expert 1804: Back office manager
Document 1810: ALL document in the place where these documents get uploaded The banking application may provide an approver home screen. The PDC interface may display the following in the activity feed area: MOCK received request to approved loan The banking application may provide an approval/reject loan renewal screen. The user logs in as an approver to review and approve contract.

Render: ContractService.getDetails
Approve Button: ContractService.approveContract→BPM
Subscription Validation task complete. Response TRUE
Reject Button: ContractService.rejectContract BPM Subscription Validation task complete. Response FALSE BackFlip™, or other multi-channel communication protocols, may also be used here to communicate with the user. The PDC interface may display the following:

Current Task 1806: Connect with Requester (Banker)
Feeds 1808: View Potential Whitespace Expert 1804: Requestor and others involved with loan creation Document 1810: documents associated with loan renewal The banking application may provide a banker home screen showing that the loan was approved. The PDC interface may display the following in the activity feed region: MOCK Loan Approved.

The banking application may include a finalize contract screen. The user may log back in as a banker to print the contract and obtain a signature from the customer.

Render: ContractService.getContractDetails

PrintContract: ContractService.signOffRenewalContract. BPM Print Contract task Complete On this screen the banker may schedule another meeting with customer, print contracts, and finalize. BackFlip™ may be used to send a confirmation request to the customer via SMS. The PDC interface may display the following:

Current Task 1806: Send to Customer for Confirmation

Feeds 1808: "Prospective Customer Needs" pushed here remove from the banking application UI frees up space for other info.

Expert 1804: Approver and Prospective Needs Experts

Document 1810: The Contract

Figure 19:
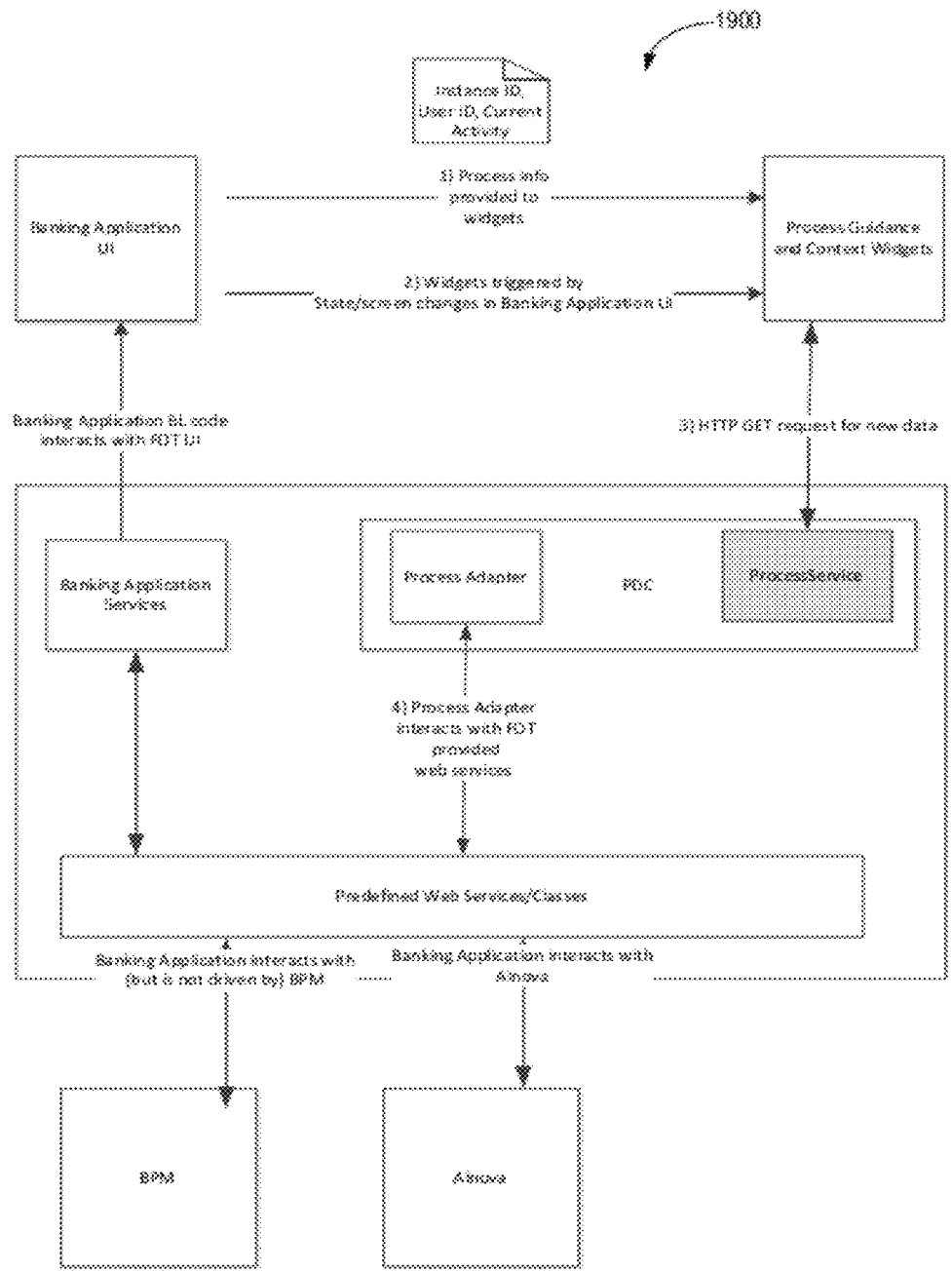
FIG. 19 shows another exemplary process flow for integrating process-driven collaboration into a BPM system and into an existing business application.
Figure 20:
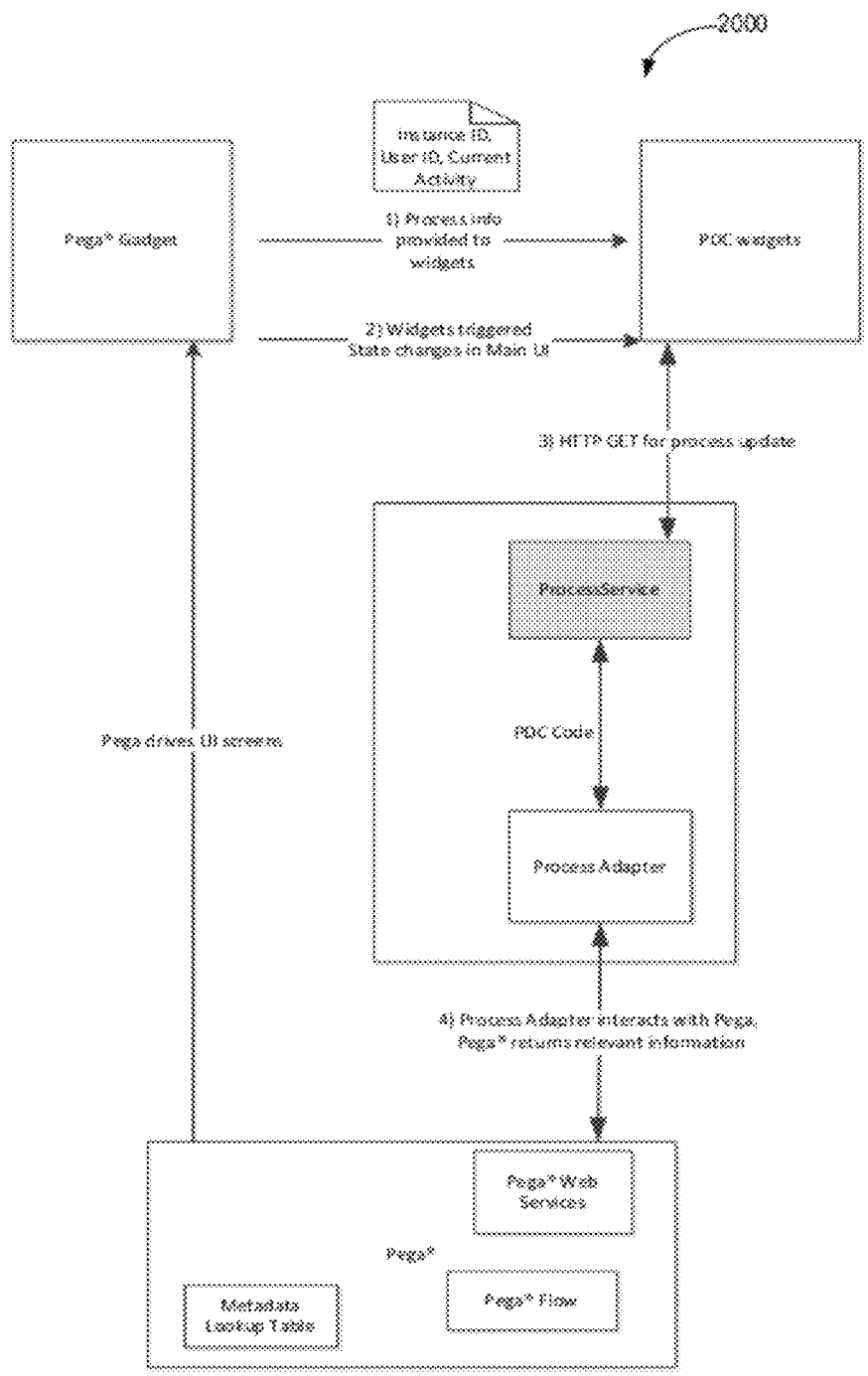
FIG. 20 shows another exemplary process flow for integrating process-driven collaboration into a BPM system and into an existing business application.

FIG. 19 shows another exemplary process flow 1900 for integrating process-driven collaboration into a BPM system and into an existing business application, such as the banking application described above. The process flow is described as follows:

1. The banking application provides information about the current step in the Process (Activity ID, Instance ID, User ID)
2. When the banking application changes its state or screen, it triggers the PDC widgets to get new data
3. The PDC widgets call their respective PDC services (e.g., Expert, Docs, Feeds)
4. The PDC Process Service queries the Process Adapter for the metadata
5. The Process Adapter interacts with the banking web services to obtain the metadata for the process
6. The metadata is returned to the PDC service that called it
7. The metadata is used by the Experts/Docs/Feeds services to obtain the Relevant Experts/Docs/Feeds for the current step in the process
8. The Relevant Experts/Docs/Feeds information is returned to the UI FIG. 20 shows another exemplary process flow 2000 for integrating process-driven collaboration into a BPM system and into an existing business application. In this example, the PDC interface is integrated with a Pega® BPM. The process flow is described as follows:

1. The Pega® main application provides information about the current step in the Process (Activity ID, Instance ID, User ID)
2. When the Pega® main application changes its state or screen, it triggers the PDC widgets to get new data
3. The PDC widgets call their respective PDC services (Expert, Docs, Feeds)
4. The PDC Process Service queries the Process Adapter for the metadata
5. The Process Adapter interacts with the Pega® web services to obtain the metadata for the process
6. The metadata is returned to service that called it
7. The metadata is used by the Experts/Docs/Feeds services to obtain the Relevant Experts/Docs/Feeds for the current step in the process
8. The Relevant Experts/Docs/Feeds information is returned to the UI Exemplary aspects, features, and components of the system are described above. However, the PDC system and application may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

A "computer-readable medium," "machine-readable medium," and/or "signal-bearing medium" may include any means that contains, stores, communicates, or transports software for use by or in connection with an instruction executable system, apparatus, or device. The computer-readable medium may selectively be, but is not limited to, an electronic, magnetic, optical, electromagnetic, infrared, or semiconductor system, apparatus, or device. A non-exhaustive list of examples of a computer-readable medium may include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A computer-readable medium may also include a tangible medium upon which software is printed, as the software may be electronically stored as an image or in another format (e.g., through an optical scan), then compiled, and/or interpreted, or otherwise processed. The processed medium may then be stored in a computer and/or machine memory.

Provided below are service definitions corresponding to the Process Service, such as the Process Service 234 shown in FIG. 2, of the PDC architecture that integrate with a client's BPM suite.

1. getProcessModel
   a. Overview
   The process list associated with the given instanceID. The list contains the main process and associated flows utilized as subflows within the main process.

b. Request

TABLE 21

| Field Name | Data Type | Description |
|---|---|---|
| instanceID | string | This is the id of the process instance the user is interacting with. |
| userID | string | ID of the current user. | c. Response

TABLE 21

XML Schema

```
<?xml version="1.0" encoding="UTF-8"?>
<schema            xmlns="http://www.w3.org/2001/XMLSchema"
targetNamespace="http://www.example.org/getProcessModel"
xmlns:tns="http://www.example.org/getProcessModel"
elementFormDefault="qualified">
    <element name="ProcessList" type="tns:ProcessList"></element>
    <complexType name="ProcessList">
        <sequence>
            <element      name="Process"      type="tns:Process"
maxOccurs="unbounded"
                minOccurs="0"></element>
        </sequence>
        <attribute name="id" type="string"></attribute>
        <attribute name="startProcessID" type="string"></attribute>
    </complexType>
    <complexType name="Process">
        <sequence>
            <element     name="name"     type="string"
maxOccurs="1" minOccurs="1"></element>
            <element name="Activity" type="tns:Activity"
                maxOccurs="unbounded" minOccurs="0">
            </element>
        </sequence>
        <attribute name="id" type="string"></attribute>
        <attribute name="startActivityID" type="string"></attribute>
    </complexType>
    <complexType name="Activity">
        <sequence>
            <element    name="name"    type="string"    maxOccurs="1"
minOccurs="1"></element>
            <element name="description" type="string" maxOccurs="1"
                minOccurs="1"></element>
            <element name="childProcessID" type="string"
                maxOccurs="1" minOccurs="1"></element>
            <element    name="nextActivities"
type="tns:ActivityIDList" maxOccurs="1"
                minOccurs="1"></element>
            <element name="previousActivities"
                type="tns:ActivityIDList" maxOccurs="1"
                minOccurs="1">
            </element>
        </sequence>
        <attribute name="id" type="string"></attribute>
    </complexType>
    <complexType name="ActivityIDList">
        <sequence>
            <element name="activityID" type="string"
                maxOccurs="unbounded" minOccurs="0"></element>
        </sequence>
    </complexType>
</schema>
``` d. Sample Success Response

TABLE 22

XML Response

```
<?xml version="1.0" encoding="UTF-8"?>
<tns:ProcessList xmlns:tns="http://www.example.org/getProcessModel"
```

TABLE 22-continued

XML Response

```
id="CommercialInsurancePega"
startProcessID="CommercialInsurance">
<tns:Process id="CommercialInsurance"
            startActivityID="ReceiveApplication">
    <tns:name>Commercial Insurance</tns:name>
    <tns:Activity id="ReceiveApplication">
        <tns:name>Receive Application</tns:name>
    <tns:description></tns:description>
        <tns:childProcessID></tns:childProcessID>
        <tns:nextActivities>
            <tns:activityID>RefineData</tns:activityID>
        </tns:nextActivities>
        <tns:previousActivities></tns:previousActivities>
    </tns:Activity>
    <tns:Activity id="RefineData">
        <tns:name>Refine Data</tns:name>
        <tns:description></tns:description>
        <tns:childProcessID></tns:childProcessID>
        <tns:nextActivities>
            <tns:activityID>SendApplication</tns:activityID>
        </tns:nextActivities>
        <tns:previousActivities>
            <tns:activityID>ReceiveApplication</tns:activityID>
        </tns:previousActivities>
    </tns:Activity>
    <tns:Activity id="SendApplication">
        <tns:name>Send Application</tns:name>
        <tns:description></tns:description>
        <tns:childProcessID></tns:childProcessID>
        <tns:nextActivities>
            <tns:activityID>ReceiveQuote</tns:activityID>
        </tns:nextActivities>
        <tns:previousActivities>
            <tns:activityID>RefineData</tns:activityID>
        </tns:previousActivities>
    </tns:Activity>
    <tns:Activity id="ReceiveQuote">
        <tns:name>Receive Quote</tns:name>
        <tns:description></tns:description>
        <tns:childProcessID></tns:childProcessID>
        <tns:nextActivities>
            <tns:activityID>AcceptQuote</tns:activityID>
    </tns:nextActivities>
        <tns:previousActivities>
            <tns:activityID>SendApplication</tns:activityID>
        </tns:previousActivities>
    </tns:Activity>
    <tns:Activity id="AcceptQuote">
        <tns:name>Accept Quote</tns:name>
        <tns:description></tns:description>
        <tns:childProcessID></tns:childProcessID>
        <tns:nextActivities></tns:nextActivities>
        <tns:previousActivities>
            <tns:activityID>ReceiveQuote</tns:activityID>
        </tns:previousActivities>
    </tns:Activity>
</tns:Process>
</tns:ProcessList>
``` e. Complex Data Types i. ProcessList

This is the root node for the getProcessModel response. It contains all the processes that make up a flow.

TABLE 23

| Field Name | Data Type | Attribute/ Element | Multiplicity (elements) | Description |
|---|---|---|---|---|
| id | string | Attribute | | The unique id of the process. |
| startProcessID | string | Attribute | | The id of the top level process that acts the main flow. |

TABLE 23-continued

| Field Name | Data Type | Attribute/Element | Multiplicity (elements) | Description |
|---|---|---|---|---|
| Process | Process | Element | Zero or more | Flows associated with the end to end process. | ii. Process
This defines a process/flow.

TABLE 24

| Field Name | Data Type | Attribute/Element | Multiplicity (elements) | Description |
|---|---|---|---|---|
| id | string | Attribute | | The unique id of the process. |
| startActivityID | string | Attribute | | The id of the top level process that acts the main flow. |
| name | string | Element | Required (one) | Name of the process. Leave blank (empty string) if no name exists. |
| Activity | Activity | Element | Zero or more | Activity in the process. | iii. Activity
This is an activity in a process/flow performed by the user or a subflow activity.

TABLE 25

| Field Name | Data Type | Attribute/Element | Multiplicity (elements) | Description |
|---|---|---|---|---|
| id | string | Attribute | | The unique id of the process. |
| name | string | Element | Required (one) | Name of the activity. Leave blank (empty string) if no name exists. |
| description | string | Element | Required (one) | A description of the activity. Leave blank (empty string) if no description exists. |
| childProcessID | string | Element | Required (one) | The id of the process called by this activity if the activity calls another process as a subflow. Leave blank (empty string) if no subflow is initiated. |
| nextActivities | ActivityIDList | Element | Required (one) | The list of activities that directly follow this activity in the process. |
| previousActivities | ActivityIDList | Element | Required (one) | The list of activities that directly precede this activity in the process. | iv. ActivityIDList
This is a list of activity ids.

TABLE 26

| Field Name | Data Type | Attribute/Element | Multiplicity (elements) | Description |
|---|---|---|---|---|
| activityID | string | Element | One or many | The id of an activity. |

2. getCurrentActivity
a. Overview
This service returns the latest activity a user has participated in. This activity is not necessarily the current activity of the end to end process.

b. Request

TABLE 27

| Field Name | Data Type | Description |
|---|---|---|
| instanceID | string | This is the id of the process instance the user is interacting with. |
| userID | string | ID of the current user. | c. Response

TABLE 28

XML Schema

```
<?xml version="1.0" encoding="UTF-8"?>
<schema        xmlns="http://www.w3.org/2001/XMLSchema"
targetNamespace="http://www.example.org/getCurrentActivity"
xmlns:tns="http://www.example.org/getCurrentActivity"
elementFormDefault="qualified">
    <element name="Activity" type="tns:Activity"></element>
    <complexType name="Activity">
        <sequence>
            <element    name="name"    type="string"
maxOccurs="1" minOccurs="1"></element>
            <element name="description" type="string" maxOccurs="1"
                minOccurs="1"></element>
            <element name="childProcessID" type="string"
                maxOccurs="1" minOccurs="1"></element>
```

TABLE 28-continued

XML Schema

```
            <element    name="nextActivities"
type="tns:ActivityIDList" maxOccurs="1"
                minOccurs="1"></element>
            <element name="previousActivities"
                type="tns:ActivityIDList" maxOccurs="1"
                minOccurs="1">
            </element>
        </sequence>
        <attribute name="id" type="string"></attribute>
</complexType>
<complexType name="ActivityIDList">
```

TABLE 28-continued

XML Schema

```
    <sequence>
        <element name="activityID" type="string"
            maxOccurs="unbounded" minOccurs="0"></element>
    </sequence>
  </complexType>
</schema>
``` d. Sample Success Response

TABLE 29

XML Response

```
<?xml version="1.0" encoding="UTF-8"?>
<tns:Activity xmlns:tns="http://www.example.org/getCurrentActivity"
    id="RefineData">
    <tns:name>Refine Data</tns:name>
    <tns:description>This activity helps refine the insurance application
data.</tns:description>
    <tns:childProcessID></tns:childProcessID>
    <tns:nextActivities >
        <tns:activityID>SendApplication</tns:activityID>
    </tns:nextActivities>
    <tns:previousActivities >
        <tns:activityID>ReceiveApplication</tns:activityID>
    </tns:previousActivities>
</tns:Activity>
``` e. Complex Data Types
i. Activity
This is an activity in a process/flow performed by the user or a subflow activity.

TABLE 30

| Field Name | Data Type | Attribute/Element | Multiplicity (elements) | Description |
|---|---|---|---|---|
| id | String | Attribute | | The unique id of the activity. |
| name | String | Element | Required (one) | Name of the activity. Leave blank (empty string) if no name exists. |
| description | String | Element | Required (one) | A description of the activity. Leave blank (empty string) if no description exists. |
| childProcessID | String | Element | Required (one) | The id of the process called by this activity if the activity calls another process as a subflow. Leave blank (empty string) if no subflow is initiated. |
| nextActivities | ActivityIDList | Element | Required (one) | The list of activities that directly follow this activity in the process. |
| previousActivities | ActivityIDList | Element | Required (one) | The list of activities that directly precede this activity in the process. | ii. ActivityIDList
This is a list of activity ids.

TABLE 31

| Field Name | Data Type | Attribute/Element | Multiplicity (elements) | Description |
|---|---|---|---|---|
| activityID | string | Element | One or many | The id of an activity. |

3. getParticipantRole
a. Overview
This service returns the given user's role in the process.
b. Request

TABLE 32

| Field Name | Data Type | Description |
|---|---|---|
| instanceID | string | This is the id of the process instance the user is interacting with. |
| userID | string | ID of the current user. | c. Response

TABLE 33

XML Schema

```
<?xml version="1.0" encoding="UTF-8"?>
<schema          xmlns="http://www.w3.org/2001/XMLSchema"
targetNamespace="http://www.example.org/getParticipantRole"
xmlns:tns="http://www.example.org/getParticipantRole"
elementFormDefault="qualified">
    <element name="Role" type="tns:Role"></element>
    <complexType name="Role">
        <sequence>
            <element      name="name"      type="string"
maxOccurs="1" minOccurs="1"></element>
        </sequence>
```

TABLE 33-continued

XML Schema

```
        <attribute name="id" type="string"></attribute>
    </complexType>
</schema>
``` d. Sample Success Response

TABLE 34

XML Response

```
<?xml version="1.0" encoding="UTF-8"?>
<tns:Role xmlns:tns="http://www.example.org/getParticipantRole"
    id="Underwriter">
    <tns:name>Underwriter</tns:name>
</tns:Role>
``` e. Complex Data Types
i. Role
This is a role held by a user in the business process.

TABLE 35

| Field Name | Data Type | Attribute/ Element | Multiplicity (elements) | Description |
|---|---|---|---|---|
| Id | string | Attribute | | The unique id of the role. |
| Name | string | Element | Required (one) | The name or alias of the role. Leave blank (empty string) if no name exists. |

4. getInstanceMetadata
a. Overview

This service returns the metadata associated with the latest activity the given user has interacted with. This activity is not necessarily the current activity of the end to end process.

b. Request

TABLE 36

| Field Name | Data Type | Description |
|---|---|---|
| instanceID | string | This is the id of the process instance the user is interacting with. |
| userID | string | ID of the current user. | c. Response

TABLE 37

XML Schema

```
<?xml version="1.0" encoding="UTF-8"?>
<schema         xmlns="http://www.w3.org/2001/XMLSchema"
targetNamespace="http://www.example.org/getInstanceMetadata"
xmlns:tns="http://www.example.org/getInstanceMetadata"
elementFormDefault="qualified">
    <element name="Metadata" type="tns:MetadataList"></element>
    <complexType name="MetadataList">
        <sequence>
            <element name="metadata" type="tns:Metadata"
                maxOccurs="unbounded" minOccurs="0">
            </element>
        </sequence>
        <attribute name="instanceID" type="string"></attribute>
        <attribute name="activityID" type="string"></attribute>
    </complexType>
    <complexType name="Metadata">
        <sequence>
            <element   name="value"   type="string"
                maxOccurs="unbounded" minOccurs="0"></element>
        </sequence>
        <attribute name="id" type="string"></attribute>
    </complexType>
</schema>
``` d. Sample Success Response

TABLE 38

XML Response

```
<?xml version="1.0" encoding="UTF-8"?>
<tns:Metadata xmlns:tns="http://www.example.org/getInstanceMetadata"
    instanceID="CollaborationInsurance__12345"
    activityID="ReceiveQuote">
    <tns:metadata id ="Product Type">
        <tns:value>commercial</tns:value>
    </tns:metadata>
    <tns:metadata id ="Nature of Business">
        <tns:value>restaurant</tns:value>
    </tns:metadata>
</tns:Metadata>
``` e. Complex Data Types
i. MetadataList
This is the list of metadata items in the latest activity the user has participated in.

TABLE 39

| Field Name | Data Type | Attribute/ Element | Multiplicity (elements) | Description |
|---|---|---|---|---|
| instanceID | string | Attribute | | The id of the process instance. |
| activityID | string | Attribute | | The id of the activity that the metadata list belongs to. |
| metadata | Metadata | Element | Zero or more | The metadata associated with the activity. | ii. Metadata
This is the set of keywords/values associated with a specific field (i.e. in a form) or response.

TABLE 40

| Field Name | Data Type | Attribute/ Element | Multiplicity (elements) | Description |
|---|---|---|---|---|
| id | string | Attribute | | The id of the field or response. |
| value | string | Element | Zero or more | The keyword/value of the field or response. |

5. getInstanceDocuments
a. Overview

This service returns the documents associated/attached to the given process instance.

b. Request

TABLE 41

| Field Name | Data Type | Description |
|---|---|---|
| instanceID | String | This is the id of the process instance the user is interacting with. | c. Response

TABLE 42

XML Schema

```
<?xml version="1.0" encoding="UTF-8"?>
<schema         xmlns="http://www.w3.org/2001/XMLSchema"
targetNamespace="http://www.example.org/getInstanceDocuments"
xmlns:tns="http://www.example.org/getInstanceDocuments"
```

TABLE 42-continued

XML Schema

```
elementFormDefault="qualified">
    <element name="DocumentList" type="tns:DocumentList"></element>
    <complexType name="DocumentList">
        <sequence>
            <element name="document" type="tns:Document"
                maxOccurs="unbounded" minOccurs="0">
            </element>
        </sequence>
        <attribute name="instanceID" type="string"></attribute>
    </complexType>
    <complexType name="Document">
        <sequence>
            <element    name="name"    type="string"
maxOccurs="1" minOccurs="1"></element>
            <element    name="type"    type="string"
maxOccurs="1" minOccurs="1"></element>
            <element    name="url"    type="string"
maxOccurs="1" minOccurs="1"></element>
            <element    name="description"    type="string"
                maxOccurs="1" minOccurs="1"></element>
        </sequence>
        <attribute name="id" type="string"></attribute>
    </complexType>
</schema>
``` d. Sample Success Response

TABLE 43

XML Response

```
<?xml version="1.0" encoding="UTF-8"?>
<tns:DocumentList xmlns:tns=
"http://www.example.org/getInstanceDocuments"
    instanceID="CommericalInsurance_12345">
    <tns:document id="Rates">
        <tns:name>Rates</tns:name>
        <tns:type>.xls</tns:type>
        <tns:url>http://example.com/documents/testDoc</tns:url>
        <tns:description>This is an excel document</tns:description>
    </tns:document>
    <tns:document id="TPSReport">
        <tns:name>TPS Report</tns:name>
        <tns:type>.doc</tns:type>
        <tns:url>http://example.com/documents/testDoc2</tns:url>
        <tns:description>This is a word document</tns:description>
    </tns:document>
</tns:DocumentList>
``` e. Complex Data Types i. DocumentList

This is the list of documents associated/attached to the process instance.

TABLE 44

| Field Name | Data Type | Attribute/ Element | Multiplicity (elements) | Description |
|---|---|---|---|---|
| instanceID | string | Attribute | | The id of the process instance. |
| document | Document | Element | Zero or more | Documents associated with process instance. | iii. Document

This is a document that is associated/attached to a process instance.

TABLE 45

| Field Name | Data Type | Attribute/ Element | Multiplicity (elements) | Description |
|---|---|---|---|---|
| id | string | Attribute | | The id of the document. |
| name | string | Element | Required (one) | Name of the document. Leave blank (empty string) if no name exists. |
| type | string | Element | Required (one) | Type (file extension) of the document. Leave blank (empty string) if type is not known or cannot be determined. |
| url | string | Element | Required (one) | URL of document. Leave blank (empty string) if URL is not known or cannot be determined. |
| description | string | Element | Required (one) | Description of the document. Leave blank (empty string) if no description exists. |

Provided below is a interface definition of ProcessAdapter 246, shown in the PDC architecture shown in FIG. 2. The ProcessAdapter 246 is the interface between the BPM/workflow system and the PDC service layer 204. Tables 46-50 show operations of ProcessAdapter 246.

TABLE 46

| | |
|---|---|
| Name | getProcessModel |
| Description | Returns the activity and process list for a particular user. |
| Inputs | instanceID: String<br>userID: String |
| Outputs | process: ProcessList |
| Exceptions | The process with the given instanceID cannot be found.<br>The participant with the given userID cannot be found.<br>Process retrieval failed. |

TABLE 47

| | |
|---|---|
| Name | getCurrentActivity |
| Description | Returns the ID of the current Activity |
| Inputs | instanceID: string<br>userID: string |
| Outputs | activity: Activity |
| Exceptions | The process with the given instanceID cannot be found.<br>The process with the given userID cannot be found.<br>Process retrieval failed. |

TABLE 48

| | |
|---|---|
| Name | getParticipantRole |
| Description | Returns the role of a user. |
| Inputs | instanceID: String<br>userID: String |
| Outputs | roleID: String |
| Exceptions | The process with the given instanceID cannot be found.<br>The user with the given user ID cannot be found.<br>Retrieval of data failed. Return error message |

TABLE 49

| | |
|---|---|
| Name | getInstanceMetadata |
| Description | Returns an array of keywords specific to the process instance (i.e. Product Type, Customer, etc) |
| Inputs | instanceID: String<br>usedID: String |
| Outputs | metadata: MetadataList |
| Exceptions | The process with the given instanceID cannot be found.<br>Data retrieval failed. |

TABLE 50

| | |
|---|---|
| Name | getInstanceDocuments |
| Description | Return links to documents/images associated with a particular instance. |
| Inputs | instanceID: String |
| Outputs | documents: DocumentList |
| Exceptions | The process with the given instanceID cannot be found.<br>Retrieval of data failed. | getProcessModel returns an object of type ProcessList (defined in PDC code). getProcessModel is used by the process guidance widget to display the activities that the user partakes in within the end to end business process. getCurrenActivity returns an object of type Activity (defined in PDC code). getCurrentActivity is used by the widgets to determine the current activity within the process instance. getParticipantRole is used by PDC to retrieve the user's role and perform subsequent filtering on contextual data (Experts, Document, Alerts). getInstanceMetadata returns a list of String objects. getInstanceMetadata is used by PDC to retrieve the relevant metadata (values) from the process instance. This is used to query different services to filter and retrieve contextual data (Experts, Documents, Alerts). getInstanceDocuments return an object of type DocumentList (defined in PDC code). getInstanceDocuments is used by PDC to retrieve the documents associated with the process instance and display them to the user.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A business process-driven collaboration system, comprising:
    a computer processor;
    a memory coupled to the computer processor, the memory comprising:
        an expert adapter configured to communicate with an external expert search engine service;
        a document adapter configured to communicate with an external document search engine service;
        a related feed adapter configured to communicate with an external feed service; and instructions that, when executed, cause the computer processor to:
        identify an action taken by a user in an interface of a business software application associated with a business process;
        identify a current activity within the business process based on the identified action;
        obtain static metadata associated with the current activity comprising keywords and an identification of collaboration activities associated with the current activity;
        query a business process management system executing the business software application;
        obtain dynamic metadata associated with the identified action from the business process management system in response to the query;
        merge the static and dynamic metadata into merged metadata;
        generate a documents query, an expert query, and a feed query based on the merged metadata;
        identify, in response to querying the document adapter with the documents query, document information identifying a set of documents associated with the current activity;
        identify, in response to querying the expert adapter with the expert query, expert information identifying one or more experts associated with the current activity;
        identify, in response to querying the related feed adapter with the feed query, feed information identifying activity feed data associated with the current activity;
        integrate a custom interface providing onto the interface associated with the business process, wherein the custom interface integrated onto the interface comprises a document section that displays the document information, an expert section that displays the expert information, and a feed section that displays the feed information;
        identify a new action taken by the user in the interface;
        automatically determine whether the current activity of the business process has changed based on the identified new action; and
        in response to a determination that the current activity of the business process has changed to a new current activity:
            obtain new static metadata associated with the new current activity;
            query the business process management system executing the business software application with a new query;
            obtain new dynamic metadata associated with the identified new action in response to the new query;
            merge the new static metadata and the new dynamic metadata into new merged metadata;
            generate a new documents query, a new expert query, and a new feed query based on the new merged metadata;
            identify, in response to querying the document adapter with the new documents query, new document information identifying a set of documents associated with the new current activity;
            identify, in response to querying the expert adapter with the new expert query, new expert information identifying one or more experts associated with the new current activity;
            identify, in response to querying the feed adapter with the new feed query, new feed information identifying activity feed data associated with the new current activity; and
            modify the documents section, the expert section, and the feed section of custom interface integrated onto the interface with the new document information, the new expert information, and the new feed information, respectively.

2. The system of claim 1, wherein integrating the custom interface comprises:
    integrating information identifying recommended collaboration activity associated with the current activity in the business process.

3. A method for enabling business process-driven collaboration, comprising:
- monitoring, using a process-driven collaboration computer processor, a current activity of a business application;
- monitoring, using the process-driven collaboration computer processor, actions taken by a user in a business application interface associated with the business application;
- obtaining static metadata associated with the current activity comprising keywords and an identification of collaboration activities associated with the current activity;
- querying a business process management system executing the business software application;
- obtaining dynamic metadata associated with the identified action from the business process management system in response to the query;
- merging the static and dynamic metadata into merged metadata;
- generating a documents query, an expert query, and a feed query based on the merged metadata;
- providing an expert adapter configured to communicate with an external expert search engine service;
- providing a document adapter configured to communicate with a external document search engine service;
- providing a related feed adapter configured to communicate with an external feed service;
- identifying, in response to querying the document adapter with the documents query, document information identifying a set of documents associated with the current activity;
- identifying, in response to querying the expert adapter with the expert query, expert information identifying one or more experts associated with the current activity;
- identifying, in response to querying the related feed adapter with the feed query, feed information identifying activity feed data associated with the current activity;
- integrating a custom interface onto an interface of the business application, wherein the custom interface comprises a document section that displays an identification of the documents associated with the current activity, an expert section that displays the expert information, and a feed section;
- monitoring a new action taken by the user in the interface of the business software application associated with the business process;
- automatically determining, based on the monitored new action taken by the user, whether the current activity of the business application has changed to a new activity; and
- in response to a determination that the current activity of the business application has changed to a new current activity:
  - obtaining new static metadata associated with the new current activity from a collaboration template stored in a memory, wherein the new static metadata comprises keywords and an identification of collaboration activities associated with the new current activity;
  - querying the business process management system executing the business software application with a new query;
  - obtaining new dynamic metadata associated with the monitored new action in response to the new query from the business application related to the actions taken by the user in the business application interface, wherein the new dynamic metadata comprises keywords associated with the actions taken by the user in the business application interface;
  - merging the new static and the new dynamic metadata into new merged metadata;
  - generating a new documents query, a new expert query, and a new feed query based on the new merged metadata;
  - identifying, in response to querying the document adapter with the new documents query, new document information identifying a set of documents associated with the new current activity;
  - identifying, in response to querying the expert adapter with the new expert query, new expert information identifying one or more experts associated with the new current activity;
  - identifying, in response to querying the feed adapter with the new feed query, new feed information identifying activity feed data associated with the new current activity; and
  - modifying the document section, the expert section, and the feed section of the custom interface integrated onto the interface with the new document information, the new expert information, and the new feed information, respectively.

4. A business process-driven collaboration system, comprising:
- a computer processor; and
- a memory coupled to the computer processor, the memory comprising:
  - an interface layer comprising instructions that, when executed, cause the computer processor to:
    - monitor a current activity of a business application;
    - monitor actions taken by a user in a business application interface associated with the business application;
    - automatically identify, based on the monitored actions taken by the user, a change from the current activity to a new activity within the business application;
    - request an identification of document information, expert information and feed information relevant to the new activity, wherein the document information comprises an identification of documents associated with the new activity, the expert information comprises an identification of experts associated with the new activity, and the feed information comprises an identification of activity feed data associated with the new activity;
    - integrate a custom interface onto an interface of the business application, wherein the custom interface comprises a document section that displays the document information, an expert section that displays the expert information, and a feed section that displays the feed information; and
    - display identified document information, expert information and feed information relevant to the new activity through the custom interface; and
  - an adapter layer comprising:
    - an expert adapter configured to communicate with an external expert search engine service;
    - a document adapter configured to communicate with an external document search engine service; and
    - a related feed adapter configured to communicate with an external feed service; and
    - instructions that, when executed, cause the computer processor to:
      - obtain static metadata associated with the new activity from a collaboration template stored in the memory, wherein the static metadata comprises keywords and an identification of collaboration activities associated with the new activity;
obtain dynamic metadata from the business application related to the actions taken by the user in the business application interface, wherein the dynamic metadata comprises keywords associated with the actions taken by the user in the business application interface;
merge the static and dynamic metadata into merged metadata;
generate a documents query, an expert query and a feed query based on the merged metadata;
identify, in response to querying the document adapter with the documents query, the document information;
identify, in response to querying the expert adapter with the expert query, the expert information;
identify, in response to querying the related feed adapter with the feed query, the feed information;
send the identified document information, expert information and feed information to the interface layer;
wherein the interface layer further comprises instructions that, when executed, cause the computer processor to:
monitor a new action taken by the user in the business application interface;
in response to a determination that the current activity of the business process has changed to a new current activity:
obtain new static metadata associated with the new current activity;
query a business process management system executing the business software application with a new query;
obtain new dynamic metadata associated with the monitored new action in response to the new query;
merge the new static metadata and the new dynamic metadata into new merged metadata;
generate a new documents query, a new expert query, and a new feed query based on the new merged metadata;
identify, in response to querying the document adapter with the new documents query, new document information identifying a set of documents associated with the new current activity;
identify, in response to querying the expert adapter with the new expert query, new expert information identifying one or more experts associated with the new current activity;
identify, in response to querying the feed adapter with the new feed query, new feed information identifying one or more experts associated with the new current activity; and
modify the documents section and the expert section of custom interface integrated onto the interface with the new document information, the new expert information, and the new feed information, respectively.

5. The system of claim 4, wherein the memory further comprises a services layer comprising instructions that, when executed, cause the computer processor to:
obtain the identification of the new activity and the metadata associated with the new activity;
send the identification of the new activity and the metadata to an adapter layer; and
wherein the identified resources are sent to the interface layer through the services layer.

6. The system of claim 4, wherein the resources comprise information identifying at least one of an expert, feed item, and recommended collaboration task associated with the new activity.

7. The system of claim 4, wherein identifying the document information and the expert information relevant to the new activity comprises querying the collaboration template stored in the memory, the collaboration template comprising information identifying the resources corresponding to the identification of the new activity.

8. The system of claim 4, wherein the instructions comprised by the interface layer, when executed, further cause the computer processor to integrate the feed section displaying the feed information onto the customer interface, wherein the feed section, document section and expert section for a single interface integrated onto the interface of the business application.

9. A product, comprising:
a non-transitory computer-readable medium comprising instructions that, when executed, cause a computer processor to:
identify an action taken by a user in an interface of a business software application associated with a business process;
identify a current activity within the business process based on the identified action;
obtain static metadata associated with the current activity comprising keywords and an identification of collaboration activities associated with the current activity;
obtain dynamic metadata associated with the identified action from the business process management system;
merge the static and dynamic metadata into merged metadata;
identify current activity-based information and resources based on an identification of the current activity and the merged metadata, wherein the current activity-based information comprises document information identifying a set of documents associated with the current activity, expert information identifying one or more experts associated with the current activity, and feed information identifying activity feed data associated with the current activity;
integrate a custom interface providing the current activity-based information and resources onto the interface associated with the business process, wherein the interface comprises a document section that displays the document information, an expert section that displays the expert information, and a feed section that displays the feed information;
identify a new action taken by the user in the interface;
automatically determine whether the current activity of the business process has changed based on the identified new action; and
in response to a determination that the current activity of the business process has changed to a new current activity:
obtain new static metadata associated with the new current activity;
obtain new dynamic metadata associated with the identified new action;
merge the new static metadata and the new dynamic metadata into new merged metadata;

identify new current activity-based information and resources based on an identification of the new current activity and the new merged metadata, wherein the new current activity-based information comprises new document information identifying a new set of documents associated with the new current activity, new expert information identifying one or more new experts associated with the new current activity, and new feed information identifying new activity feed data associated with the new current activity; and modify the custom interface integrated onto the interface with activity-based information and resources based on the metadata associated with the new current activity, and modify the document section to include the new set of documents, the expert section to include the new expert information, and the feed section to include the new feed information.

\* \* \* \* \*

UNITED STATES PATENT AND TRADEMARK OFFICE
CERTIFICATE OF CORRECTION

PATENT NO. : 9,165,286 B2  Page 1 of 1
APPLICATION NO. : 13/039289
DATED : October 20, 2015
INVENTOR(S) : David E. Trier et al.

It is certified that error appears in the above-identified patent and that said Letters Patent is hereby corrected as shown below:

In the Specification

In column 24, line 61, after "Reject Button:" replace "ContractService.rejectContract BPM" with --ContractService.rejectContract→BPM--.

In column 25, lines 12-13, after "PrintContract:" replace "ContractService.signOffRenewalContract. BPM" with --ContractService.signOffRenewalContract.→BPM--.

Signed and Sealed this
Nineteenth Day of July, 2016

Michelle K. Lee
*Director of the United States Patent and Trademark Office*